(12) United States Patent
Matsuo et al.

(10) Patent No.: US 7,839,867 B2
(45) Date of Patent: Nov. 23, 2010

(54) INFORMATION DELIVERY SYSTEM, DELIVERY REQUEST PROGRAM, TRANSFER PROGRAM, DELIVERY PROGRAM, AND THE LIKE

(75) Inventors: Hideki Matsuo, Nagoya (JP); Yoshihiko Hibino, Nagoya (JP); Yuji Kiyohara, Nagoya (JP); Hiroaki Suzuki, Nagoya (JP); Kentaro Ushiyama, Nagoya (JP); Koichi Iijima, Higashikurume (JP); Tomohiro Kudo, Tsukuba (JP); Osamu Tatebe, Ushiku (JP); Yuetsu Kodama, Tsukuba (JP); Kazuyuki Shudo, Kawasaki (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 435 days.

(21) Appl. No.: 11/890,473

(22) Filed: Aug. 7, 2007

(65) Prior Publication Data

US 2007/0297422 A1    Dec. 27, 2007

Related U.S. Application Data

(63) Continuation-in-part of application No. PCT/JP2006/302038, filed on Feb. 7, 2006.

(30) Foreign Application Priority Data

Feb. 8, 2005  (JP) .............................. 2005-031795
Jan. 27, 2006  (JP) .............................. 2006-019826

(51) Int. Cl.
  *H04L 12/56*  (2006.01)
  *G06F 15/167*  (2006.01)
(52) U.S. Cl. ..................... 370/400; 370/408; 709/213

(58) Field of Classification Search ............ 370/395.32, 370/400, 408, 411; 707/1, 3, 10; 709/213, 709/214, 216, 217; 711/216
See application file for complete search history.

(56) References Cited

U.S. PATENT DOCUMENTS 6,633,873 B1    10/2003  Nakamura (Continued)

FOREIGN PATENT DOCUMENTS

JP    A-2000-235583    8/2000

(Continued)

OTHER PUBLICATIONS

Zhao et al., "Tapestry: An Infrastructure for Fault-tolerant Wide-area Location and Routing," Report No. UCB/CSD-01-1141, Apr. 2001.

(Continued)

*Primary Examiner*—Pankaj Kumar
*Assistant Examiner*—Saba Tsegaye
(74) *Attorney, Agent, or Firm*—Oliff & Berridge, PLC

(57) ABSTRACT

In a first node in a system having nodes connected to each other as a network, request information including identification information and request number of location information indicating a location in the network of information saving nodes is transmitted to a second node. In the second node, the location information and identification information are saved. At least the location information whose number corresponds to the request number is transmitted to the first node when the number of the saved location information meets the request number. Otherwise, the location information whose number corresponds to the number of the saved location information is transmitted to the first node. The received request information is transferred when the second node itself is not a management node, to a node interposed between the second node and the management node, or to the management node when there is no node therebetween.

34 Claims, 13 Drawing Sheets

U.S. PATENT DOCUMENTS

| | | | |
|---|---|---|---|
| 7,096,228 B2 * | 8/2006 | Theimer et al. | 707/101 |
| 7,313,565 B2 * | 12/2007 | Zhang et al. | 707/101 |
| 7,555,527 B1 * | 6/2009 | Slaughter et al. | 709/213 |
| 2004/0249970 A1 * | 12/2004 | Castro et al. | 709/238 |
| 2005/0135381 A1 * | 6/2005 | Dubnicki et al. | 370/395.32 |

FOREIGN PATENT DOCUMENTS

| | | |
|---|---|---|
| JP | A 2004-21321 | 1/2004 |
| JP | A-2004-127168 | 4/2004 |

OTHER PUBLICATIONS

Oka et al., "Lightweight Load Balancing for Distributed Hash Tables," Technical Report of the Institute of Electronics, Information and Communications Engineers, 2004.

Chen et al., "Dynamic Replica Placement for Scalable Content Delivery," Department of EECS, University of California at Berkeley, Mar. 7-8, 2002.

Office Action issued in Japanese Patent Application No. 2006-019826; mailed Jun. 15, 2010; with English-language translation.

* cited by examiner

| 01300000 | 10230210 | 22031000 | 32201010 |
|---|---|---|---|
| IP ADDRESS 0 | — | IP ADDRESS 2 | IP ADDRESS 3 |

| 10230210 | 11320101 | 12020230 | 13210001 |
|---|---|---|---|
| — | IP ADDRESS 4 | IP ADDRESS 5 | IP ADDRESS 6 |

(B)

| 10000302 | — | 10230210 | — |
|---|---|---|---|
| IP ADDRESS 7 | | | |

(C)

| — | — |
|---|---|

(D)

| | TARGET DIGIT OF EACH LEVEL 0 | TARGET DIGIT OF EACH LEVEL 1 | TARGET DIGIT OF EACH LEVEL 2 | TARGET DIGIT OF EACH LEVEL 3 |
|---|---|---|---|---|
| LEVEL 1 | 01300000 | 10230210 | 22031000 | 32201010 |
| | IP ADDRESS 0 | — | IP ADDRESS 2 | IP ADDRESS 3 |
| LEVEL 2 | 10230210 | 11320101 | 12020230 | 13210001 |
| | — | IP ADDRESS 4 | IP ADDRESS 5 | IP ADDRESS 6 |
| LEVEL 3 | 10000302 | — | 10230210 | — |
| | IP ADDRESS 7 | | | |
| LEVEL 4 | — | — | — | — |
| LEVEL 5 | 10230210 | — | — | — |
| LEVEL 6 | — | — | 10230210 | — |
| LEVEL 7 | — | 10230210 | — | 10230210 |
| LEVEL 8 | 10230210 | — | — | — |

INFORMATION DELIVERY SYSTEM, DELIVERY REQUEST PROGRAM, TRANSFER PROGRAM, DELIVERY PROGRAM, AND THE LIKE

CROSS REFERENCE TO RELATED APPLICATION

This is a Continuation-in-Part of International Application No. PCT/JP2006/302038 filed Feb. 7, 2006, which claims the benefit of Japanese Applications Nos. 2005-031795 filed Feb. 8, 2005 and 2006-019826 filed Jan. 27, 2006. The disclosures of the prior applications are hereby incorporated by reference herein in their entirety.

BACKGROUND OF THE INVENTION

1. Field of the Invention

The present invention relates to a peer to peer (P2P) content delivery system which includes a plurality of node devices which are connected with each other via a network and, especially, relates to a technical field of an information delivery system, delivery request program, transfer program, delivery program, and the like in which content data which is to be delivered from one node device to the other is distributed and saved in a plurality of node devices.

2. Discussion of the Related Art

In this kind of content delivery system, each of node devices has a list in which location information regarding content data distributed to and saved in a plurality of node devices is described (for example, information which enables to specify an IP address or the like of a node device which saves the content data by designating auxiliary information such as a title of the content data: Hereinafter referred to as index information) and on the basis of index information described in the list, it becomes possible to download content data which a user wants. Such a list is common information to be used commonly among a plurality of node devices and generally is managed by a management server which manages all the content data saved on a content delivery system so that the list is delivered from the management server to each node device.

For example, in the Nonpatent Document 1, as a method which does not use a management server, a technique using a distributed hash table (DHT) has been disclosed. In this system, a request node device which requests delivery of content inquires location of a node device, which saves content information, to a management server which manages content information to access the node device.

Nonpatent Document 1: "Lightweight Load Balancing for Distributed Hash Tables". Technical Report of the Institute of Electronics, Information, and Communication Engineers.

SUMMARY OF THE INVENTION

However, in a content delivery system using a distributed hash table (DHT), there may be a case where a request node which requests delivery of content wants to obtain desired content as quickly as possible by being connected to a plurality of node devices which save the desired content to receive content information from each of the plurality of node devices.

In such a case, it can be assumed that a request node requests location of a plurality of node devices which save content information and receives location of node devices which save the content information from node devices which has location of node devices which save the content information for the requested amount. However, in a node device which was inquired about location of a plurality of node devices, unless location of as many node devices which satisfy the request are included in a list of the node device, the node device does not reply to the request node. Therefore, there arises a problem that until the inquiry reaches a node device which has location of as many node devices as requested in the list and a reply which includes location of as many node devices as requested is transmitted from the node device, the request node must wait for a response from an upper stream node device.

The present invention is provided in consideration of the above problems and the object of the present invention is to provide a content delivery system, a delivery request program, a transfer program, a delivery program, and the like which enables a request node to obtain content from a plurality of node devices which save desired content efficiently.

With the above problems being taken into consideration, according to an aspect of the present invention, there is provided an information delivery system having a plurality of node devices connected each other to thereby configure a network, including:

a first node device included in the plurality of node devices having:

a request information generation means for generating request information based on unique identification information corresponding to specific common information and request number information indicative of request number of node information to thereby request transmission of the node information, indicative of a plurality of information saving node devices, which are included in the plurality of node devices and save the specific common information, which is specified out of common information to be shared among the plurality of node devices, to a second node device which is included in the plurality of node devices;

a request information transmission means for transmitting the request information thus generated to the second node device;

a node information receiving means for receiving the node information from the second node device;

a delivery request means for requesting delivery of the specific common information to the information saving node device corresponding to the node information; and a specific common information receiving means for receiving the specific common information delivered from the information saving node device, the second node device having:

a saving means for saving node information indicative of the information saving node device which saves the common information and unique identification information corresponding to the common information in correspondence with the node information and the identification information each other;

a node information search means for searching node information for the amount of request number upon receipt of the specific common information after receipt of the request information from any of the plurality of node devices, the node information corresponding to the identification information included in the received request information and indicated by request number information, included in the request information in reference of the saving means;

a node information transmission means for transmitting, in a case where request of the request number of the node information or more is found, at least the requested amount of the node information to the first node device, and for transmitting, in a case where the requested amount of node information is not found, node information thus found to the first node device; and a transfer means for transferring the request information and transmitted node information, which is node information already transmitted to the first node device by the node information transmission means, in a case where the second node device itself is not a management device which manages the specific common information, to a node device interposed between the second node device and the management device, or to the management node device in a case where there is no node device therebetween.

BRIEF DESCRIPTION OF THE DRAWINGS

FIG. 4(A) shows an example of a table in level 1, FIG. 4(B) does an example of a table in level 2, FIG. 4(C) does an example of a table in level 3, and FIG. 4(D) does an example of a completed routing table.

DETAILED DESCRIPTION OF THE PREFERRED EMBODIMENTS

Figure 1:
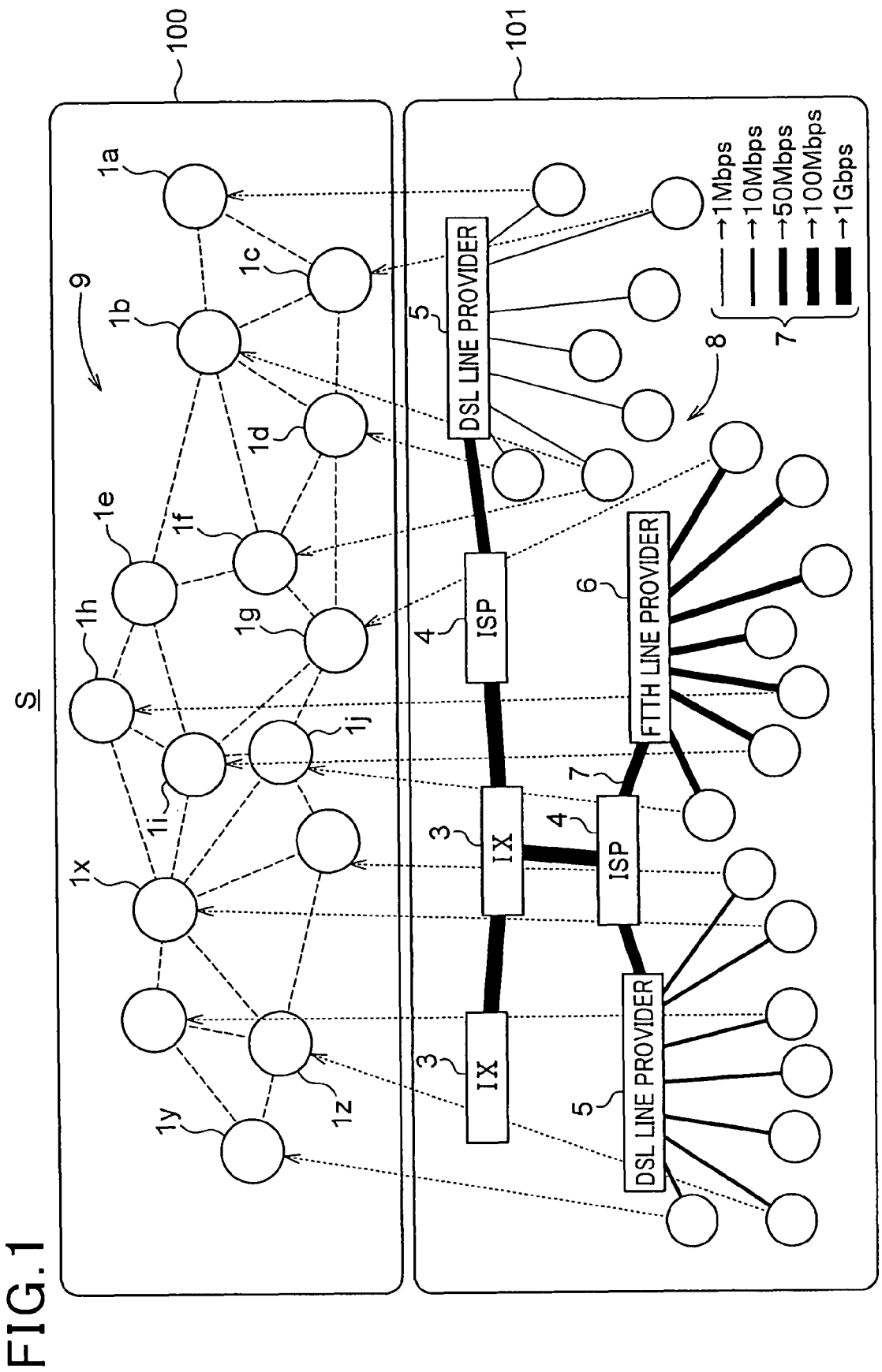
FIG. 1 shows an example of connection status of each node device in a content delivery system according to the present embodiment.

Hereafter, preferred embodiments of the present invention will be described in reference of the figures. Note that embodiment explained below relates to a case where the present invention is applied to a content delivery system.

In the followings, reference numerals are exemplified as follows.

1: node device; 8: network; 11: control part; 12: storage part; 13: buffer memory; 14: decoder part; 15: image processing part; 16: display part; 17: audio processing part; 18: speaker; 20: communication part; 21: input part; 22: bus; S: content delivery system; Ca, Cb, Cc, Cd, Cg, Ch, and Ci: content node; and Ka, Kb, Kg, and Kh: cache node.

Embodiments

[1. Configuration and the Like of Content Delivery System]

First, with reference to FIG. 1, general configuration and the like of a content delivery system will be explained.

FIG. 1 shows an example of connection status of each of node devices in a content delivery system according to the present embodiment.

As shown in lower rectangular frame 101 in FIG. 1, a network 8 (network in real world) of the Internet or the like is configured by an internet exchange (IX) 3, internet service provider (ISP) 4, digital subscriber line provider (or device thereof) 5, fiber to home line provider ('s device) 6, and communication line (for example, such as a telephone line or an optical cable) 7 and the like.

A content delivery system S is configured by a plurality of node devices $1a$, $1b$, $1c$ ... $1x$, $1y$, $1z$ ... which are connected with each other via such network 8 as communication means and is a peer to peer network system. Moreover, to each of the node devices $1a$, $1b$, $1c$ ... $1x$, $1y$, $1z$ ..., unique manufacturing number and internet protocol (IP) address have been assigned respectively. Note that none of manufacturing number and IP address overlaps in a plurality of node devices 1. In the explanation below, there are cases where any of node devices $1a$, $1b$, $1c$ ... $1x$, $1y$, $1z$ ... is called a node device 1 for the convenience of explanation.

[Overview of 1-1 DHT]

Hereafter, an algorithm using a distributed hash table (hereinafter DHT) according to the present embodiment will be explained.

In the above-mentioned content delivery system S, when the node device 1 accesses information included in another node device 1, it is required for the node device 1 to know IP address of the counterpart as node information.

For example, in a system in which content is shared among each node devices, a simple method is for each node device 1 to know IP addresses of all the node devices participating in the network 8. However, when there are tens or hundreds of thousand of terminals, it is not realistic to memorize the IP addresses of all the node devices 1. Moreover, when power of an arbitrary node device is turned on or off, it is required for each of the node devices 1 to frequently update IP address of the arbitrary node device and therefore, it is difficult to operate the system.

Hence, a system in which one node device 1 memorizes (saves) necessary and minimum IP addresses of node devices 1 among all the node devices and for a node device 1 of which IP address is not unknown (not saved), information is transferred between node devices 1 has been invented.

As an example of such a system, an overlay network 9 shown in the upper rectangular frame 100 of FIG. 1 is configured by an algorithm using DHT. In other words, the overlay network 9 means a network which configures a virtual network formed by using an existing network 8.

In the present embodiment, an overlay network 9 configured by an algorithm using DHT is a premise and a node device 1 provided on this overlay network 9 is called a node device 1 participating in the content delivery system S (in other words, participating in the overlay network 9). Note that participation into the content delivery system S is performed when a node device which has not participated yet sends participation request to any arbitrary node device 1 which has already participated in.

A unique number is attached to a node device 1 participating in the content delivery system S as node ID of each node device. The number is required to have a bit number which can contain maximum number of devices that the node device can operate. For example, when the number is a 128-bit number, the node device can operate $2^{128} ≒ 340 \times 10^{36}$ node devices.

More specifically, a node ID of each node device 1 is a hash value obtained by hashing a unique number of each node device such as an IP address or manufacturing number by a common hash function (hash algorithm) and is distributed and located in one ID space without deviation. As such, each of the (hashed) node IDs obtained by a common hash function in such a manner has a very low possibility of having same values when the IP address or the manufacturing number differs from each other. Note that regarding hash function, since it is heretofore known, detailed explanation thereof is omitted. Furthermore, in the present embodiment, node ID is obtained by hashing an IP address (global IP address) by a common hash function.

Moreover, in the plurality of node devices 1 participating in the content delivery system S, content data (for example, a movie or music) as common information to be delivered from one node device 1 to another node device 1 is distributed and saved (stored). For the content data, a unique number is also attached to each content data (hereinafter referred to as content ID).

Then, the content ID is set to be the same length as node ID (for example, 128-bit) and a key word such as the name of the content (content title) or general information of the content (plot) is hashed by the same hash function as that used when the node ID is obtained (that is, to be provided on the same ID space as the hash value of an IP address of a node device 1). A node device 1 of which node ID is closest to the hash value of the key word (for example, upper digit numbers match the most) saves the content data, or manages location information thereof. Thus, it is possible to distribute content data on the content delivery system S without deviation. Note that a case where the same key word is used for different content data (for example, name of the content) can be assumed. In such a case, same hash values are obtained. To avoid this, a key word to be hashed can be a combination of a name of the content and copyright information (for example, a name of a performer, a director, a singer, a composer, or a lyric writer).

Figure 2:
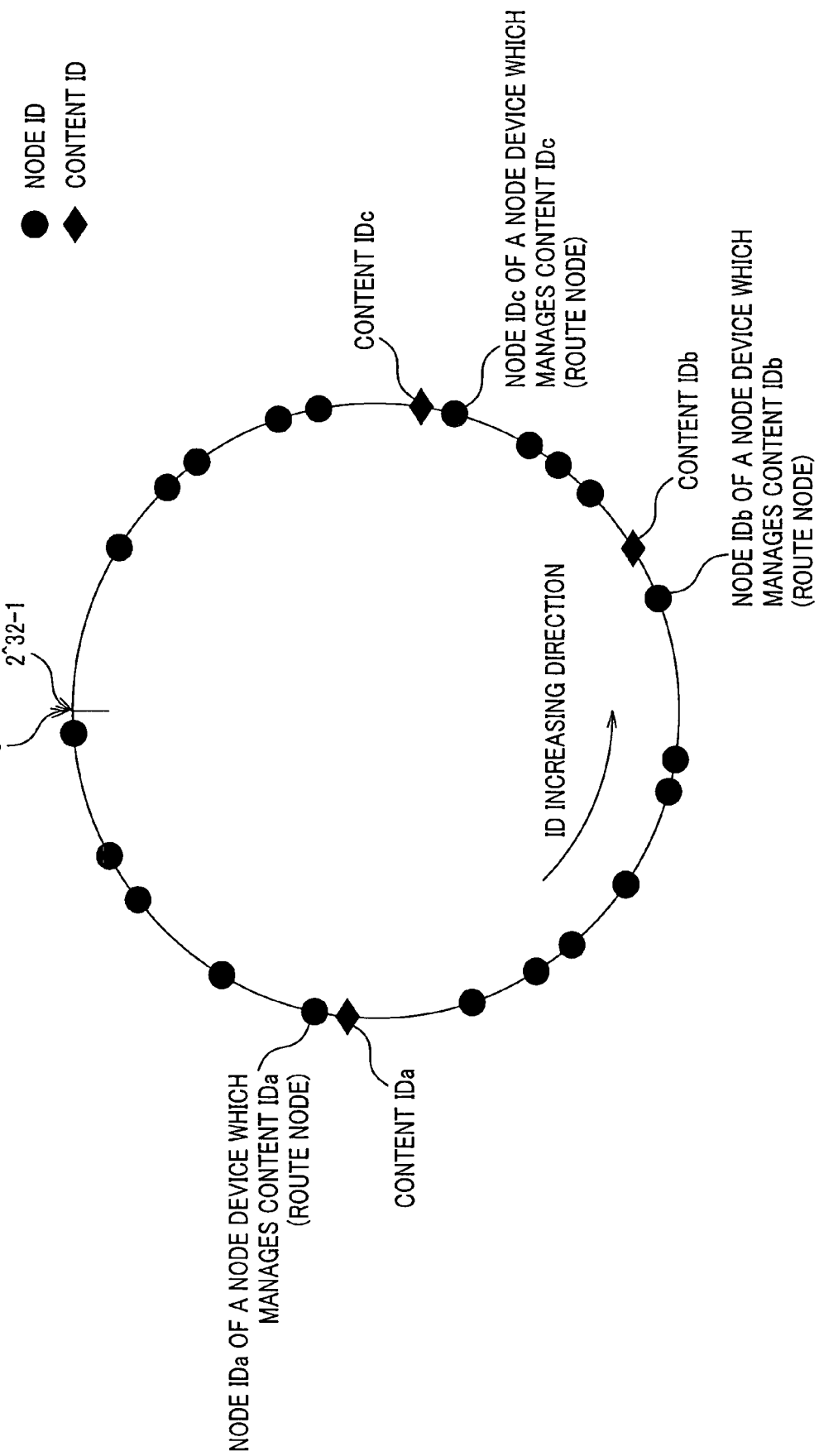
FIG. 2 is a graphical illustration of an ID space.

As such, since the node ID and content ID attached to each node device 1 and content data were generated by a common hash function, as shown in FIG. 2, they can be assumed to be distributed in a same ring-shaped ID space without much deviation. The figure graphically shows a case where a node ID and a content ID have been allocated with the length of 32-bit. A black circle in the figure denotes a node ID while a black rhombus denotes a content ID. The Id is assumed to increase in a counterclockwise direction.

Next, to which node device 1 which content is to be saved is determined by a certain rule. In the present embodiment, the rule is, "a node device which manages content data including a certain content ID is a node device 1 of which node ID is closest to the content ID". Here, definition of "close ID" is one of which difference between a content ID is the smallest and does not exceed the content ID. However, when management of each content data is allocated to each node device 1, it is required to be only consistent. In an example shown in the figure, based on this definition, a content Ida is managed by a node device having node IDa and a content IDb is managed by a node device having node IDb. Note that there may be a case where a plurality of content data is managed by a certain node device.

Here, "manage" does not mean a condition where content data is saved/retained but means "knowing to which node device 1 the content data is saved". That is, in FIG. 2, a node device 1 which has the node IDa knows to which node device 1 the content data having content Ida is saved and a node device 1 which has the node IDb and a node device 1 which has node IDc also know to which node device 1 content data having the content IDb and content IDc are saved, respectively. Thus, a node device which knows to which node device 1 certain content data is saved is called a route node of the content data. That is, the node device 1 having node IDa is a route node of content data having content IDa, the node device 1 having node IDb is a route node of content data having content IDb, and the node device 1 having node IDc is a route node of content data having content IDc.

Moreover, a case where a route node of certain content data stops its function or content data is deleted from a node device in which content data has been saved (hereinafter referred to as simply "content node") can be assumed even when pairs of content data and route nodes are made under the rule of "a node device which manages content data having a certain content ID is a node device 1 which has a node ID closest to the content ID". Even in such a case, unless a route node confirms survival of content data and updates index information or the like of the route node itself, content data information managed by the route node remains definitely. Then, although the content data was deleted once, when the same content data is registered, a route node is selected according to the above-mentioned rule again and by the participation of a new node device, a node device different from the previous one may be selected as a new route node.

Therefore, even when pairs of content data and route nodes are made under the rule of "a node device which manages content data having a certain content ID is a node device 1 which has a node ID closest to the content ID", as the content delivery system S configures a vast network including hundreds or thousands of devices, withdrawal of a node device from the content delivery system S (due to power source cut-off or partial disconnection in the network) and participation may be performed with a high frequency and saving and deletion of content data to a node device may be also performed with a high frequency. Hence, there are actually many node devices which know a content node that saves certain content data.

Moreover, a node device which retains certain content data is not restricted to only one device. There is a case where many node devices save the one content data and participate in the content delivery system S. In such a case, each node device to be a route node may be determined respectively depending on the condition at the time when each node device participates in the content delivery system S. Hence, as a result, a certain node device may know two or more node devices (content nodes) which retain the one content data.

[1-2. Creation of a Routing Table]

Figure 3:
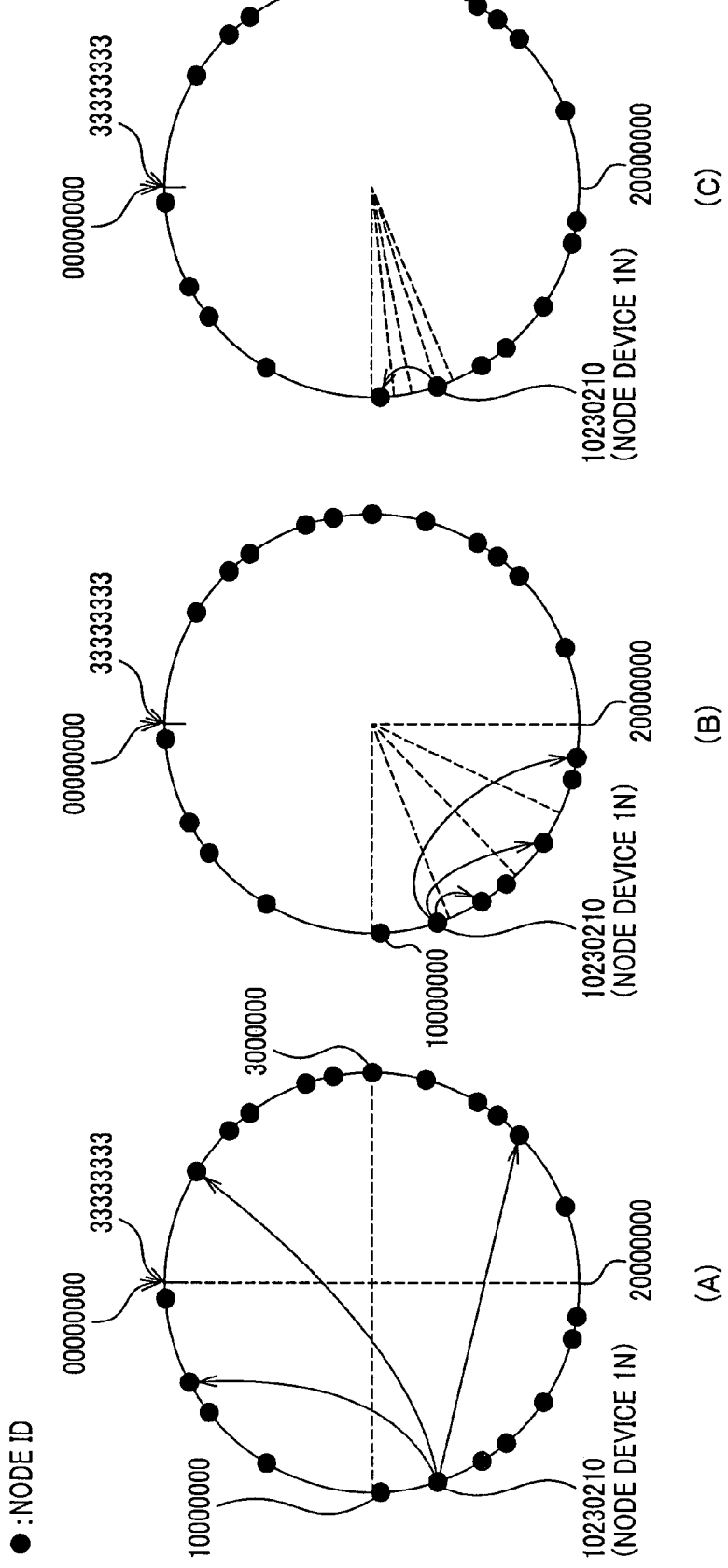
FIG. 3 shows an example that a routing table is made by a DHT.

Here, with reference to FIG. 3, an example of creation method of a routing table used in DHT is explained.

FIG. 3 is a view showing an example where a routing table is created by DIIT.

First, as shown in FIG. 3(A), ID space is divided into several areas. Although ID space is frequently divided into 16 areas in actuality, for the convenience of explanation, here the space is divided into four and ID is expressed by quarternary number of which bit length is 16-bit. Here, a node ID of a node device 1N is "10230210" and an example where a routing table of the node device 1N is created is explained.

(Routing in Level 1)

First, when the ID space is divided into four, there are four areas of which maximum digit number differ from each other when expressed by quarternary number, such as "0XXXXXXX", "1XXXXXXX", "2XXXXXXX", and "3XXXXXXX" (here, "X" is any of natural number from 0 to 3 and the same is applied hereinafter). Since the node ID of the node device 1N is "10230210", the node device 1N exists in left lower area of "1XXXXXXX" in the figure. Then, the node device 1N randomly selects a node device 1 existing in an area other than the area where the node device 1N exists (that is, an area other than "1XXXXXXX") and saves an IP address of the node device in a table in level 1. FIG. 4(A) is an example of a table in level 1. The second raw indicates the node device 1N itself and therefore it is not necessary to save the IP address.

(Routing in Level 2)

Next, as shown in FIG. 3(B), among four areas generated by division by the above routing, an area where the node device 1N itself exists is further divided into four to make four more areas, "10XXXXXX", "11XXXXXX", "12XXXXXX", and "13XXXXXX". Then, similarly to the above, a node device 1 existing in an area where the node device 1N does not exist is randomly selected and an IP address of the node device is saved in a table in level 2. FIG. 4(B) is an example of a table in level 2. The first raw indicates the node device 1N itself and therefore it is not necessary to save the IP address.

(Routing in Level 3)

Further, as shown in FIG. 3(C), among four areas generated by division by the above routing, an area where the node device 1N itself exists is further divided into four to make four more areas, "100XXXXX", "101XXXXX", "102XXXXX", and "103XXXXX". Then, similarly to the above, a node device 1 existing in an area where the node device 1N does not exist is randomly selected and an IP address of the node device is saved in a table in level 3. FIG. 4(C) is an example of a table in level 3. The third raw indicates the node device 1N itself and therefore it is not necessary to save the IP address thereof and the second and fourth rows are left blank because there exists no node devices in these areas.

Thus, from level 4 to level 8, as shown in FIG. 4(D) of routing tables, routing tables are created in a similar manner and all the 16-bit IDs are covered. The higher the level becomes, the more blank space can be found in the table.

A routing table created according to the method explained above is created and possessed by all the node device 1.

[1-3. Search Method for Content Data]

Next, with reference to FIG. 5, an example of search for a node device 1 which saves content data (hereinafter referred to as "content node") in the present embodiment will be explained.

Figure 5:
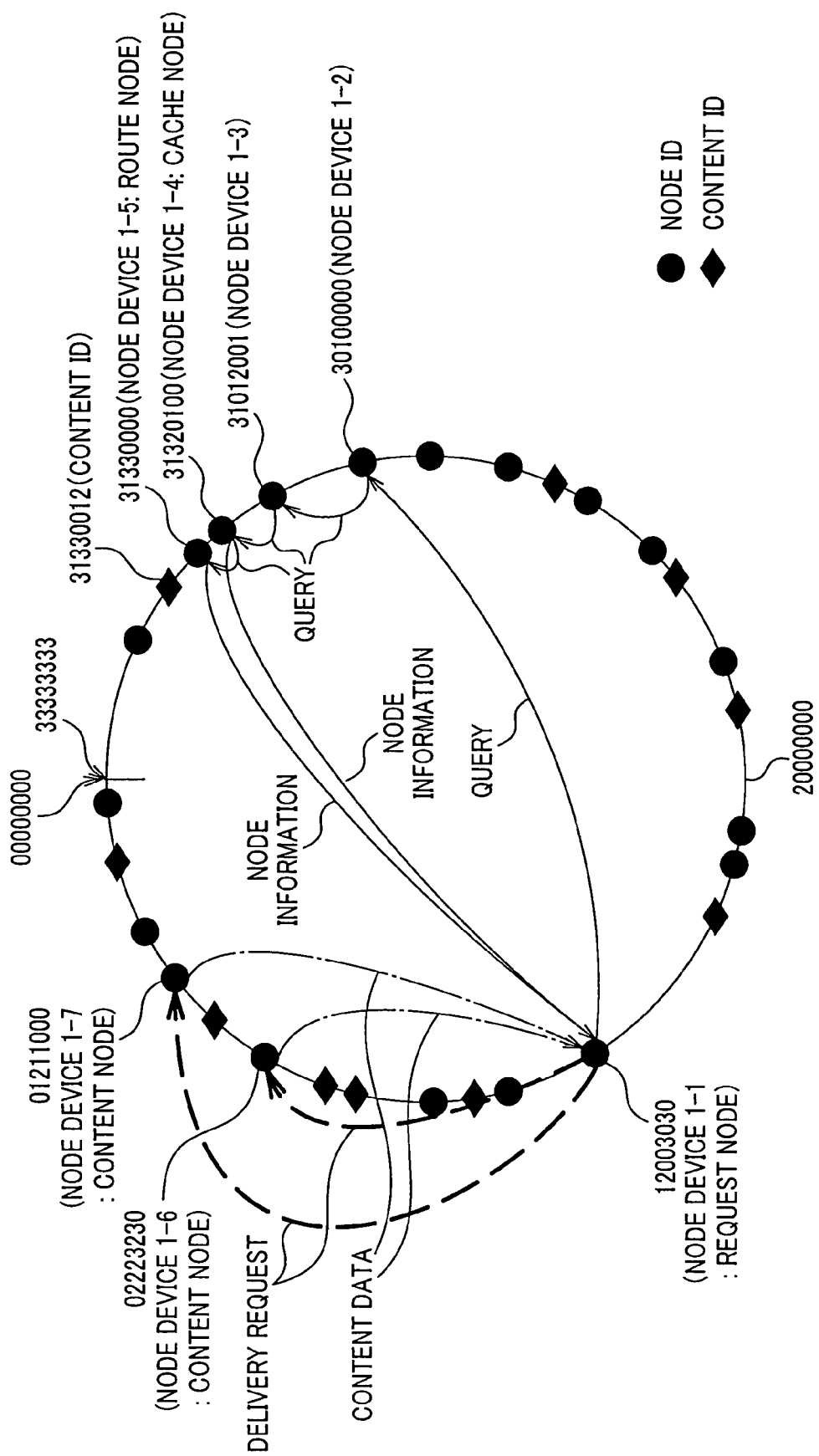
FIG. 5 shows an example that a node device 1 which saves content data is searched by a DHT in the present embodiment.

FIG. 5 shows an example of a content data being searched by a DHT.

Here, an explanation will be given on a case where a node device 1-1 of which node ID is "12003030" (hereinafter referred to as a "request node") searches for a content node retaining content data of which content ID is "31330012". Note that as shown in the figure, node IDs of content nodes which retain content ID "31330012" are "00213000" and "02223230".

In FIG. 5, a route from a request node to a node device 1-5 which manages content data having content ID "31330012" (that is, a route node) is shown by arrows with a full line and a node device 1-4 on the route is a cache node which caches and retains index information saved by the route node.

First, the request node transmits content inquiry information (hereinafter, "content inquiry information" is referred to as "query") to a node device of which node ID is in the same area as content ID "31330012".

Here, query transmitted by the request node will be explained.

The query includes not only content ID "31330012" which indicates desired content, but also request number information which indicates how many node information of the content node is requested. That is, a case where a plurality of the one content data exist in the content delivery system S can be assumed. In such a case, the request node requests delivery of the content to a plurality of content nodes which retain desired content when request for content delivery is carried out.

At this time, when request number of IP address as node information of content node is set large, there is an advantage that delivery of the content can be received from many node devices in a juxtaposing manner, enabling to receive the content more quickly. Moreover, since the number of content nodes to which one node device can be connected is limited, when the number is assumed to be "10", the request number for IP address of content nodes can be set to "15", which is a little larger than the limit. The reason why the request number is set larger is for insurance for the case of connection failure. That is, it is assumed that when delivery request is carried out to a content node, the content node cannot be accessed due to power cut-off, or desired content cannot be delivered due to a certain reason and the request node may not be able to be connected with the request number of content nodes. On the other hand, in case of unpopular content, since the content itself may hardly exist in the system, or there are not many cache nodes to correspond to the content. Hence, by setting the request number small, there is an advantage that a query is not transferred to a route node and node information of content nodes can be prepared in a short period of time. Therefore, a user of a request node can change the setting depending on the usage.

Thus, the request node transmits not only content ID indicating desired content, but also request number information indicating number of requested node information of the content node by including them together in a query and, based on the node information received from a plurality of content nodes (number of the content nodes corresponds to the request number received from the request node or each of cache nodes), the request node accesses the plurality of content nodes and requests delivery of the content.

Note that in the following explanation of a search method of content data using FIG. 5, it is assumed that the request number is "2" so that it can be easily explained that content data can be easily found when a query is transferred on the network and that each of the found content data is retained in each content node to be deliverable.

First, the request node refers to a table of level 1 of a routing table that the request node retains and transmits a query including request number information of which request number is "2" to a node device of which node ID is in the same area as the content ID "31330012". That is, since content ID "31330012" is in an area of "3XXXXXXX", among all the node devices 1 in the area of "3XXXXXXX", the query is transmitted to a node device 1-2 of which IP address is known by the request node (that is, IP address is saved in the routing table of the request node).

According to the example shown in FIG. 5, since address of the node device 1-2 of which node ID is "30100000" has been saved in the routing table of the request node, the request node transmits the query to the node device 1-2 of which node ID is "30100000".

Next, the node device 1-2 which received the query refers to index information retained by the node device 1-2 itself, confirms existence of information of content node which corresponds to the content ID "31330012" and, when there is no information, refers to a table of level 2 of a routing table retained by the node device 1-2 itself to transfer the query to a node device 1-3 of which IP address is known to the node device 1-2, among all the node devices 1 belonging in the area of "31XXXXXX".

Thus, to an upper stream node device, that is, a node device between the request node and the route node, the query is transferred and by matching the content ID from its upper digit, the query approaches the route node.

Then, the node device 1-3 which received the query from the node device 1-2 refers to index information retained by the node device 1-3 itself, confirms existence of information of content node which corresponds to the content ID "31330012" and, when there is no information, refers to a table of level 3 of a routing table retained by the node device 1-3 itself to transfer the query to a node device 1-4 of which IP address is known to the node device 1-3 (node ID 31320100), among all the node devices 1 belonging in the area of "313XXXXX".

The node device 1-4 which received the query from the node device 1-3 refers to index information retained by the node device 1-4 itself and confirms existence of information of content node which corresponds to the content ID "31330012". Since the node device 1-4 is the above-mentioned cache node, the node device 1-4 can obtain at least one information of the content node. Then, node information of the content node (node device 1-6) is transmitted to the request node and request number of the request number information included in the query is updated from "2" to "1".

The request node which received node information of the content node (node device 1-6) transmits delivery request to request delivery of the content to the content node (node device 1-6), as indicated by the broken line with an arrow in FIG. 5. The content node (node device 1-6) which received the delivery request delivers the content data to the request node as indicated by the dashed-dotted line with an arrow in FIG. 5.

Moreover, the node device 1-4, which transmitted node information of the content node (node device 1-6) to the request node, refers to a table of level 4 of a routing table retained by the node device 1-4 itself to transfer (relay) the query to a node device 1-5, which is a route node and of which IP address is known to the node device 1-4, among all the node devices 1 belonging in the area of "3133XXXX". Then, by transmitting node information which has already been transmitted as already-transmitted node information to an upper stream node device with the query, it is possible for the upper stream node device to know if the query has been updated or not. Furthermore, as another method, the request number information may include a request number sent from the original requester (this number is not updated). In this case, when the original request number and current request number differ from each other, it is understood that the query has been updated.

Finally, when the query reaches the node device 1-5 which manages the content data, that is, a route node, the route node performs a search in index information managed by the route node itself based on the content ID "31330012" included in the query and confirms existence of information of a content node to which the query has not been transmitted and corresponds to the content ID "31330012". Then, when the content node (a node device 1-7) is found, the route device transfers the query to which instruction information to instruct the content node to transmit relevant information to the request node has been attached to the content node.

Then, the request node which received node information from each of the content nodes (node devices 1-7) transmits delivery request to request delivery of the content to the content nodes (node devices 1-7), as indicated by the broken line with an arrow in FIG. 5, and the content nodes (node devices 1-7) which received the delivery request deliver the content data to the request node as indicated by the dashed-dotted line with an arrow in FIG. 5.

That is, by receiving delivery of the content from a plurality of node devices, the request node can obtain all the data which configures the content more quickly than receiving delivery of the content from one content node. In this case, for example, one content data is divided into a plurality of data components and the first half of the data may be delivered from the content node to which the request node is connected first (node device 1-6) and the second half of the content may be delivered from the content node to which the request node is connected later (node device 1-7), or delivery may be received in a juxtaposing manner. Note that when the delivery is received in a juxtaposing manner, practically, packets transmitted in order from each content node is received in the order of transmission and order the packets may be rearranged in a later-described presentation layer (a presentation layer which is the sixth layer of a so-called OSI model) in a communication part of the request node.

[1-4 Registration Method of Content Data]

A case where, for example, a node device 1 discloses new content data so that other node devices on the content delivery system S can see it in the content delivery system S configured as above, will be explained. The node device 1 is a content node as an information saving node device which retains (saves) the content.

The content node obtains content ID from the title or the like of the content and transmits a disclosure message to a node device having the same node ID as the content ID (at this point of time, it is not known yet whether the node device exists or not). The disclosure message is, similarly to the query, relayed and transferred from one node device to another according to the routing table. When the message is transferred to a node device 1 having a node ID which is the closest to the content ID included in the disclosure message and the node device 1 judges that there is no other node device as a transmission destination for the message, the node device judges that the node device 1 itself must become a route node for the content and saves the content ID, auxiliary information (attribute information such as title or genre, copyright information such as name of the director, or the like) and IP address of the content node as index information.

[2. Configuration of Node Device and the Like]

Next, with reference to FIG. 6, configuration and function of a node device 1 will be explained. Note that according to the processing performed by each node device, each of the node device 1 functions as a request node as a first node device which inquires location of content, a cache node as a second node device which receives a query from the request node or a terminal on a route, a route node as a second node device and a management node device which manages the content, and a content node as an information saving node device which retains content as specific common information which is a target of inquiry from the request node. However, the configuration thereof is the same.

Figure 6:
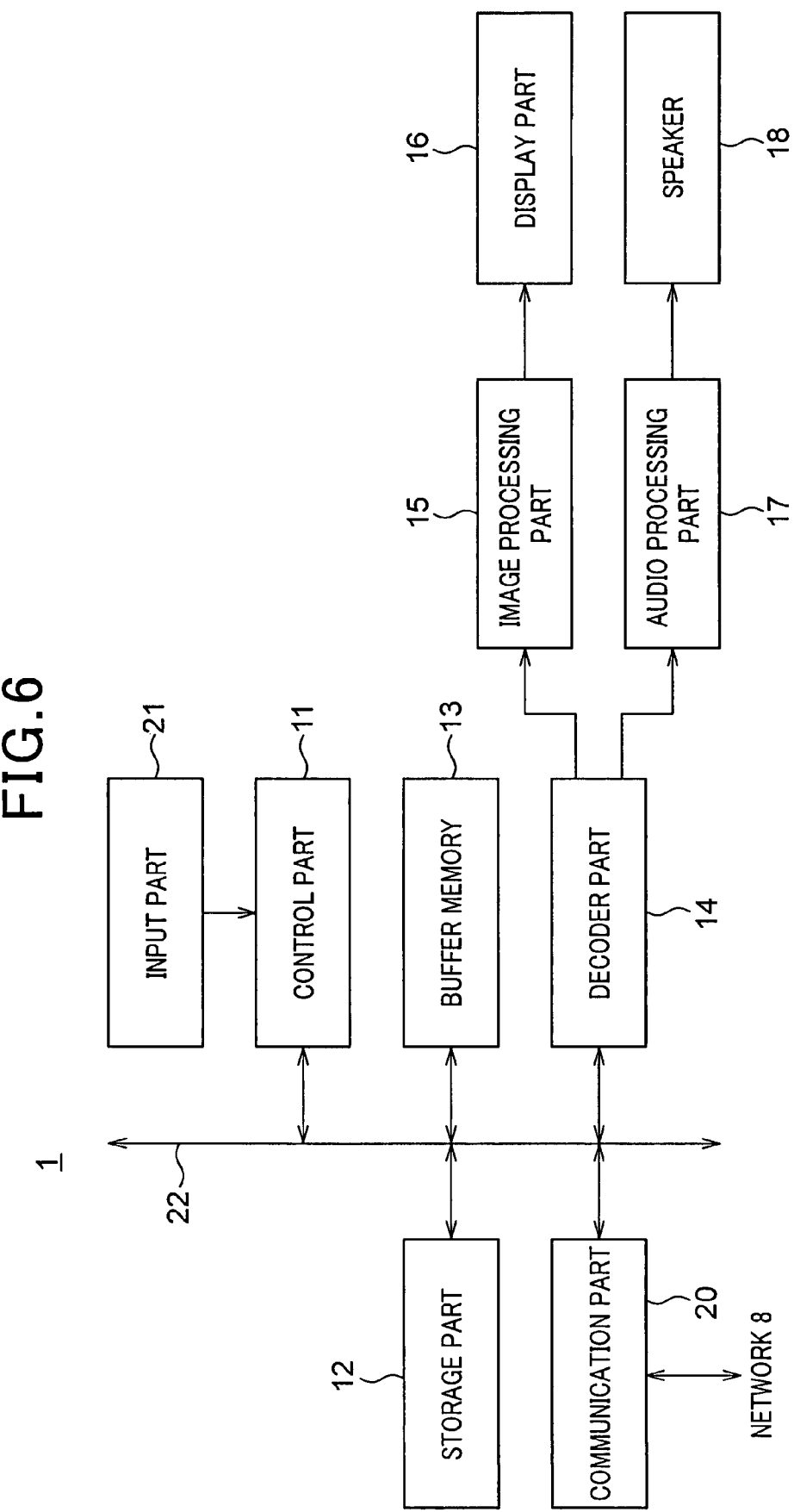
FIG. 6 shows an example of schematic structure of the node device 1.

FIG. 6 is a view showing an example of schematic structure of the node device 1.

Each of the node device 1 is configured by including, as shown in FIG. 6, a control part 11 which is a computer configured by having a CPU having computing function, a RAM for work, and a ROM for storing various data and programs, a storage part 12 configured by an HDD or the like for saving and retaining (storing) the content data, the index information, DHT and programs, and the like (some node devices 1 do not save the content data), a buffer memory 13 for temporarily storing received content data, a decoder 14 for decoding (stretching data or decrypt) encoded video data (image information 9 and audio data (voice information) included in the content data, an image processing part 15 for performing predetermined graphic processing to the decoded video data or the like to output the data as video signal, display part 16 such as CRT or liquid crystal display for displaying image based on the video signal outputted from the image processing part 15, audio processing part 17 for converting the decoded audio data by digital/analog (D/A) conversion into analog audio signal and thereafter amplifying the converted signal by an amplifier to output, a speaker 18 for outputting the audio signal outputted from the audio processing part 17 as acoustic wave, communication part 20 for performing communication control of information between node device via the network 8, and input part 21 which receives instruction from a user and provides instruction signal corresponding to the instruction to the control part 11 (for example, such as a key board, a mouse, or an operation panel) and the control part 11, the storage part 12, the buffer memory 13, the decoder part 14, and the communication part 20 are connected with each other via a bus 22.

Then, the CPU in the control part 11 performs various programs saved in the storage part 12 or the like to control the whole of the node devices 1 and functions as the request node as the first node device, the cache node as the second node device, the route node as the second node device and the management node device, and the content node as the information saving node device.

When the node device 1 functions as the request node, the control part 11 functions as request information generation means, request information transmission means, node information receiving means, delivery request means, and specific common information receiving means, when the node device 1 functions as the cache node or the route node, the control part 11 functions as saving means, node information search means, node information transmission means, and update means, and when the node device 1 functions as the content node, the control part 11 functions as delivery means.

[3. Operation of Content Delivery System]

Next, operation of each node device in the content delivery system S will be explained.

Here, processing performed by each node when the request node performs content delivery request is explained in detail. As mentioned above, all the node devices 1 included in the content delivery system S can be any of a request node, a cache node, a route node, a content node, a node on a route, or any other node, etc.

For example, when a user operates the input part 21 provided to the node device 1 to instruct inquiry of location of desired content data as specific common information, the node device I functions as a request node as s first node device. Moreover, a node device 1 which received a query from the request node or from a node device existing in between for inquiry of location of content data functions as a cache node or a route node, while a node device 1 which received a query, to which instruction information which instructs transmission of relevant information has been attached, from a route node or a cache node functions as a content node.

Hereafter, processing in node device 1 when the node device 1 functions as each node will be explained by use of FIGS. 7 to 11.

[3-1. Processing in Request Node]

First, using FIGS. 7 to 9, processing in a request node will be explained.

Figure 7:
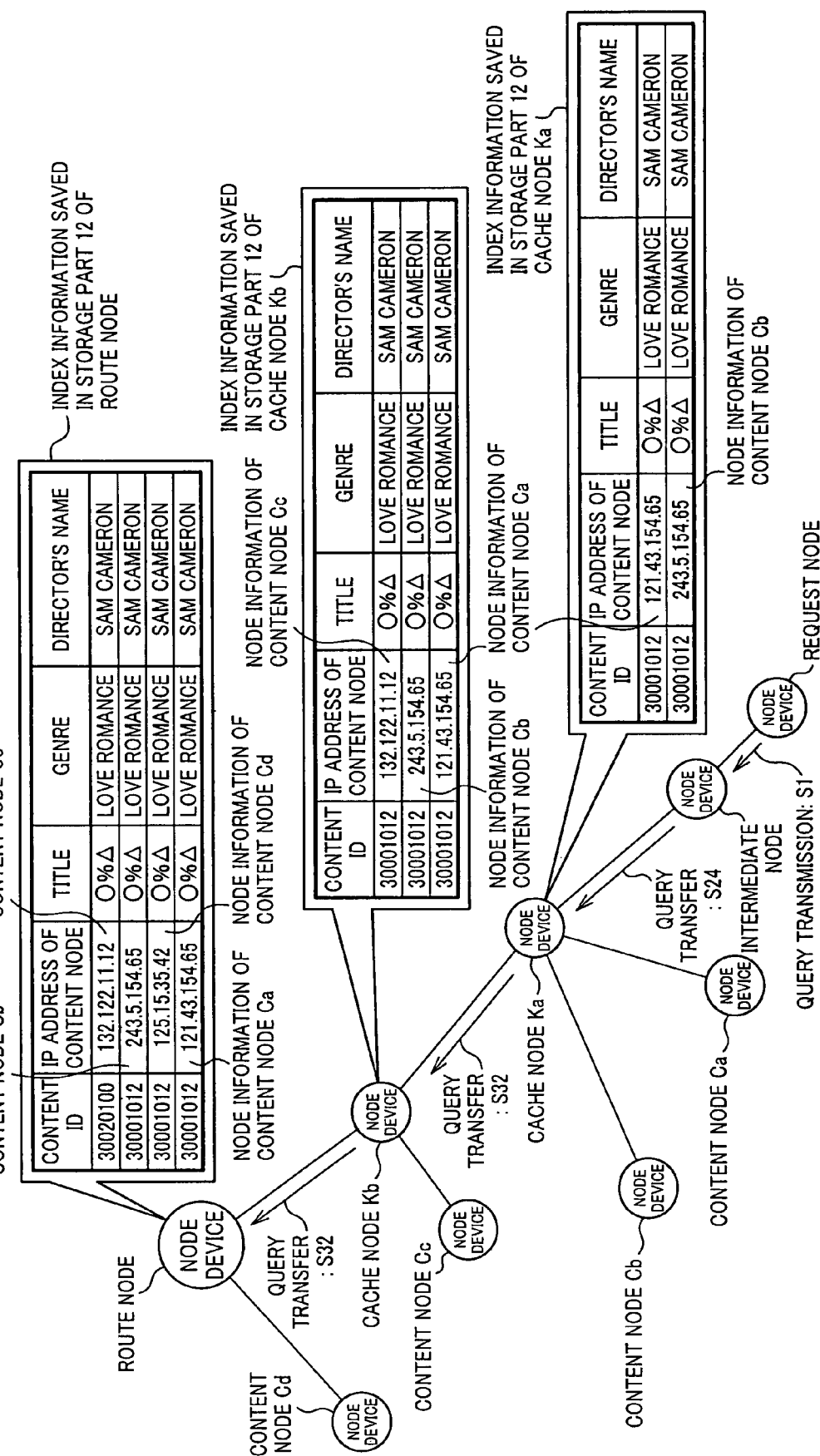
FIG. 7 is a graphical illustration where transmission and receiving of various information between each node is expressed as a spanning tree.
Figure 8:
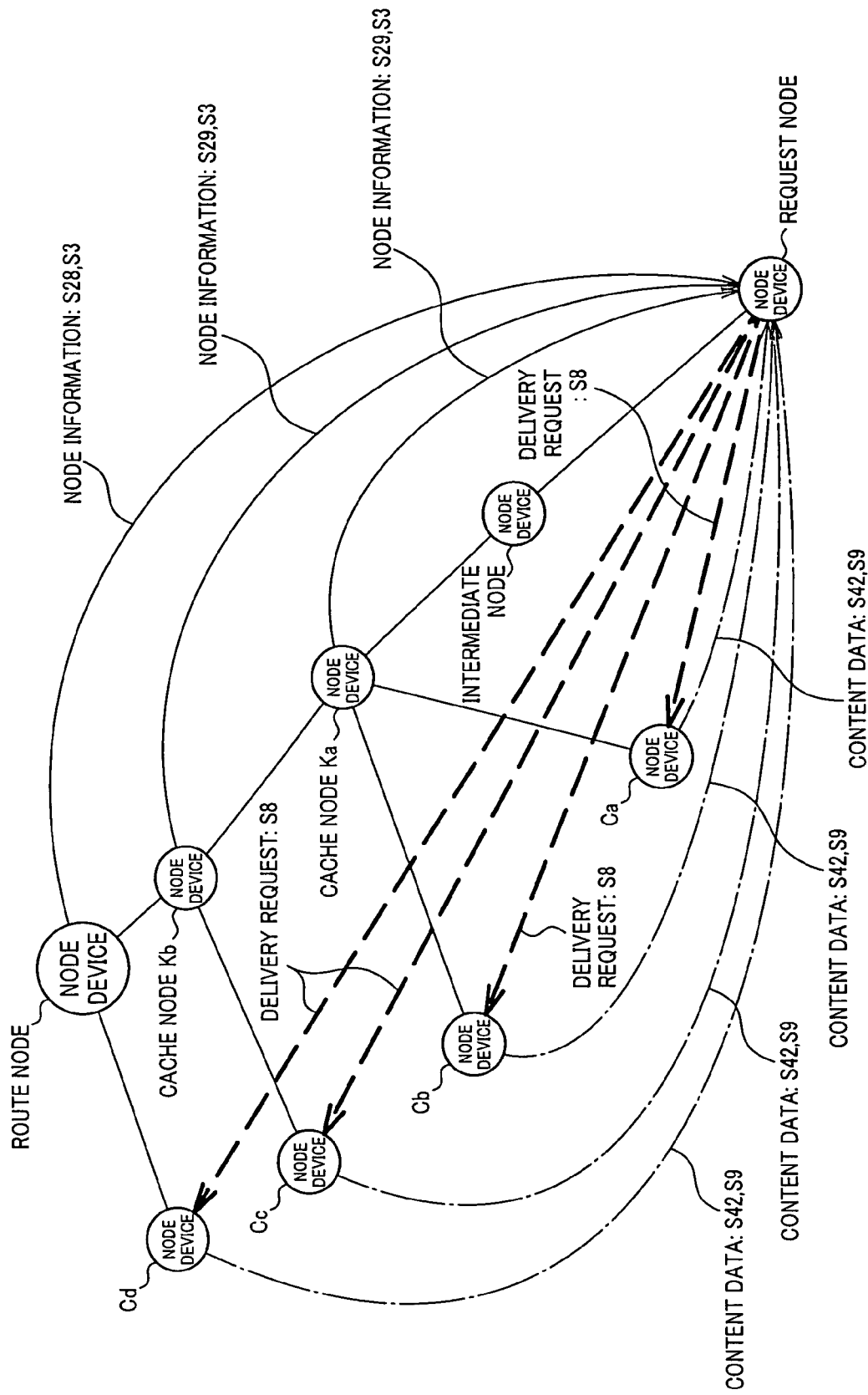
FIG. 8 is a graphical illustration where transmission and receiving of various information between each node is expressed as a spanning tree.
Figure 9:
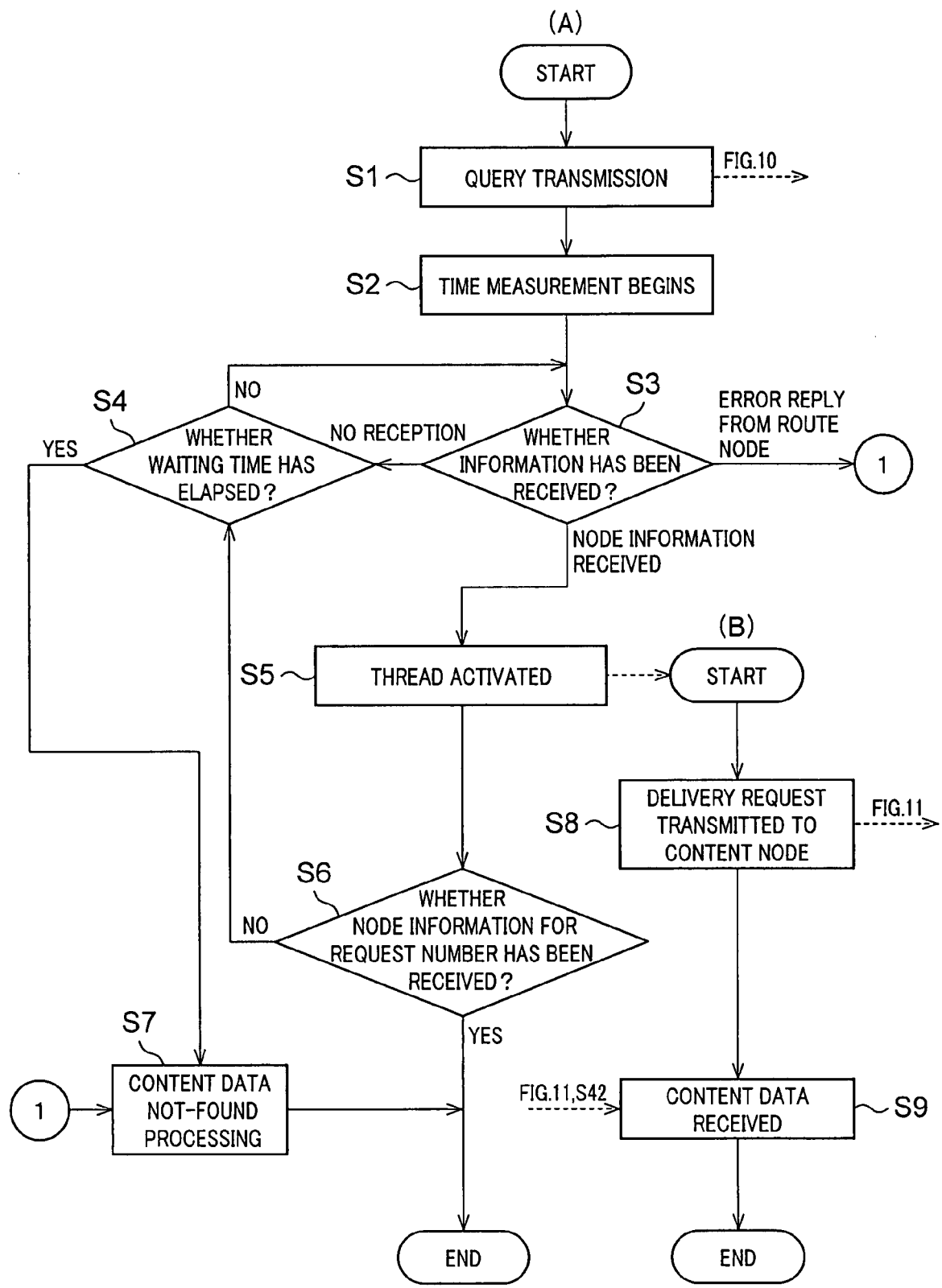
FIG. 9 is a flow chart showing processing by a control part 11 in a request node.

FIGS. 7 and 8 are graphical illustrations in which examples of transmission and receiving of various information between nodes are expressed as a spanning tree. In the figures, an intermediate node is a node which does not have index information valid to a targeted content and a cache node is a node which has the index information. Moreover, in FIG. 7, information of each content node reaches the route node via cache nodes Ka and Kb as a disclosure message when the content is registered. Therefore, content node information existing in index information of storage part 12 of the cache node Ka also exists in index information of storage part 12 of the cache node Kb and, furthermore, the route node has all the content node information. Note that, although practically index information of each node is overwritten and updated on various occasions such as when survival of the content node could not be confirmed or the like, for the convenience of explanation, explanation of update by overwriting is omitted here.

FIG. 8 is a flow chart showing processing of a delivery request program saved in the control part 11 of the request node performed by the control part 11 and in processing shown in FIG. 9(A), when thread activation is performed (processing in later-described Step S5), in parallel with processing activity in FIG. 9(A) which is performed subsequently, content receiving processing shown in FIG. 9(B) is performed.

First, a user operates the input part 21 and inputs title or the like of desired content as specific common information and relevant information of a content node which retains the content is requested. At this time, request number of the requested node information is also inputted.

As the request number, a desired number may be inputted by the user. Also, by referring a catalog list in which title or popularity of the contents are listed, the user may input the number according to popularity of the content or the request number may be inputted automatically according to the popularity. In the catalog list, with title of the content, synopsis of the content, name of the director, name of the singer, name of the original author, popularity of the content based on the frequency of delivery request is coordinated for each content and listed. The catalog list is periodically delivered from an arbitrary node device 1 which is caused to function as a management server for controlling the whole of the contents to each node device 1.

When inquiry of location of desired content data is thus performed, the control part 11 functions as identification information transmission means, hashes title or the like of the content to generate content ID indicating the content data (unique identification information corresponding to specific common information) and, at the same time, transmits a query including the content ID thus generated, IP address information of the request node, and request number information indicating a request number inputted by the input part 21 to other node devices 1 referring to a routing table saved in the storage part 12 (Step S1). Selection method of the other node devices 1 follows a method explained in detail in [1-3. Search method for content data]. According to the example shown in FIG. 7, the query is transmitted to an intermediate node, which is neither a cache node nor a route node. Note that in this example, content ID indicating the desired content is "30001012" and the request number is "4".

Subsequently, by use of a built-in clock or the like which is provided in the device, measurement of time starts (Step S2).

After that, whether any information has been received from other node devices or not is judged (Step S3) and when no information has been received (Step S3: no received information), processing proceeds to Step S4 to judge whether a predetermined waiting time (for example, 10 seconds or the like) has elapsed or not and when the time has elapsed (Step S4: Yes), the processing proceeds to Step S7. In Step S7, a predetermined content node not-found processing is performed and the processing is finished. Meanwhile, when the predetermined waiting time has not elapsed (Step S4: No), the processing moves to Step S3 to wait for reception of information.

Meanwhile, when information received in Step S3 is an error reply from a route node (Step S3: error reply from route node), predetermined content node not-found processing is performed (Step S7) and the processing is finished. Note that in the content node not-found processing in Step S7, when no node information has been received, it is assumed that the desired content does not exist in the content delivery system S at all. Therefore, a message such as "Specified content is not registered" is displayed on the display part 16 and in case where at least one node information has been received but the amount of node information does not reach the request number, "Node information for the amount of request number cannot be found" or the like is displayed on the display part 16.

On the other hand, when information received in Step S3 is node information from a content node (Step S3: node information) (that is, when the control part 11 functions as relevant information receiving means), thread is activated and content receiving processing shown in FIG. 9(B) is started (Step S5).

Then whether node information has been received for the amount of request number inputted when the query was transmitted in Step S1 or not is judged (Step S6) and when the amount of node information does not reach the request number (Step S6: No), the processing proceeds to Step S4 and while in the response waiting time (that is, Step S4: No), reception of information is waited and when the amount of node information satisfies the request number (Step S6: Yes), the processing is finished.

On the other hand, when a thread is activated in Step S5, based on node information received in Step S3, delivery request is performed to a content node (Step S8).

To explain specifically using FIG. 8, when IP address of the content node as node information is obtained from the cache node Ka (or from the cache node Kb or the route node) as shown by a solid line with an arrow, delivery request is performed to a content node Ca (or to a content node Cb, Cc, or Cd) with the IP address as destination (broken line with an arrow).

Then, as shown by dashed-dotted line in the figure, content data delivered from a content node, to which delivery request has been performed, is received (Step S9) and the processing is finished.

Note that every time node information is received in Step S3, a thread is activated for each time in the processing in Step S5 and content receiving processing shown in FIG. 9(B) is performed. However, when delivery of content is received from a plurality of content nodes as shown in FIG. 8, application software which is equivalent to reception software for receiving content generates a plurality of processing units (referred to as "thread" here) for receiving content so that a plurality of processing can be performed in a juxtaposing manner. Although it is not appropriate to assume that the plurality of processing are performed simultaneously in a juxtaposing manner in terms of time, by dividing processing time of the CPU into very short units, it is possible to allocate the processing time to the plurality of threads to perform a plurality of processing simultaneously, as if content is received from each content node simultaneously in a juxtaposing manner (to tell more accurately, because processing of another thread can be performed during a waiting time on an IP protocol of each thread, processing similar to the case of simultaneous activation can be performed). To explain with an example shown in FIG. 8, the request node receives node information from the cache nodes Ka and Kb and the route node and performs delivery request to each of content nodes Ca to Cd sequentially and finally, threads for the number of the content nodes Ca to Cd are activated and the CPU performs processing to each of the threads sequentially so that content is received from each content node in a juxtaposing manner. Thanks to such a configuration, it is possible for the request node to receive content quickly.

[3-2. Processing in Cache Node and Route Node]

Figure 10:
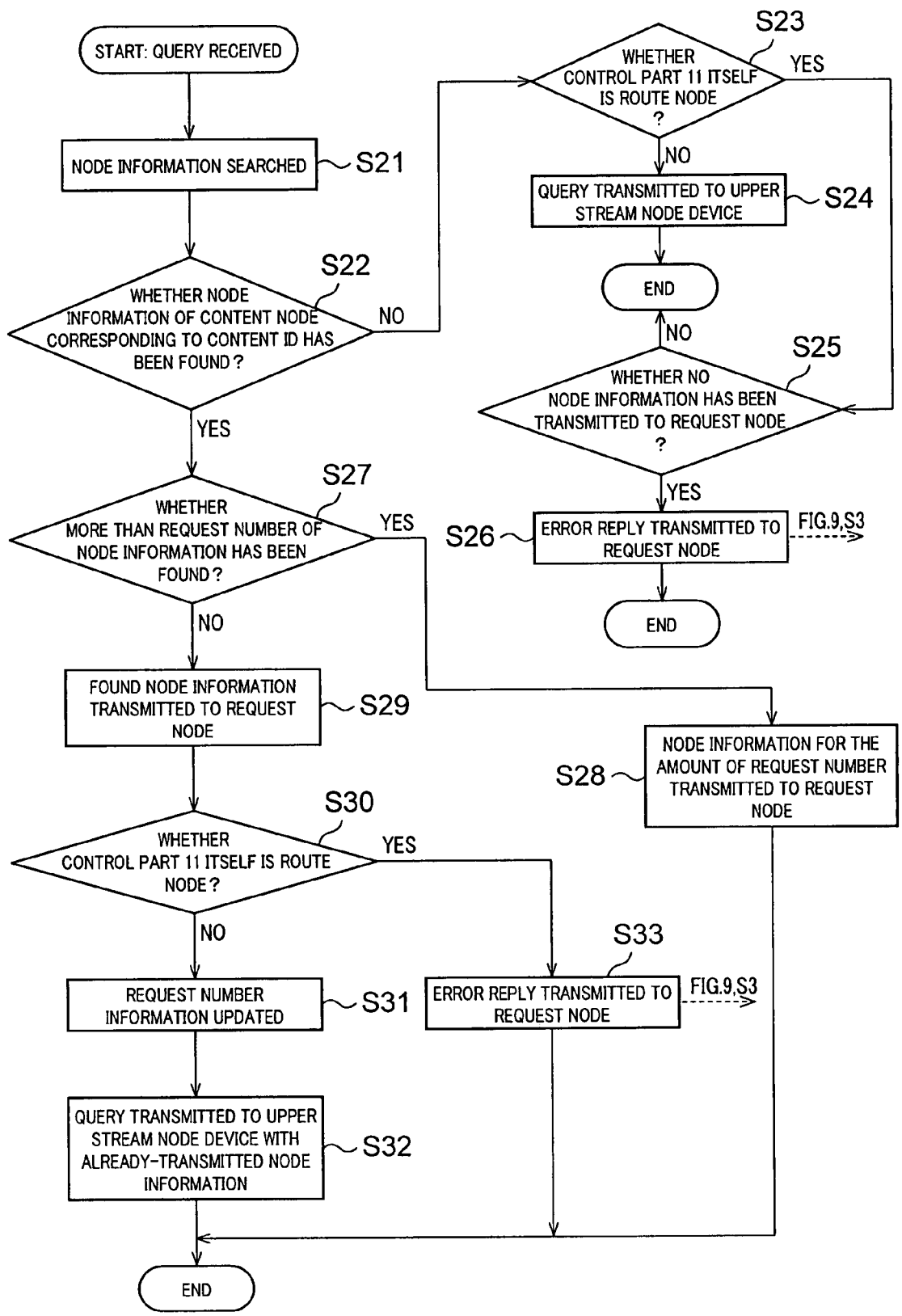
FIG. 10 is a flowchart showing processing by the control part 11 in a cache node or a route node.
Figure 11:
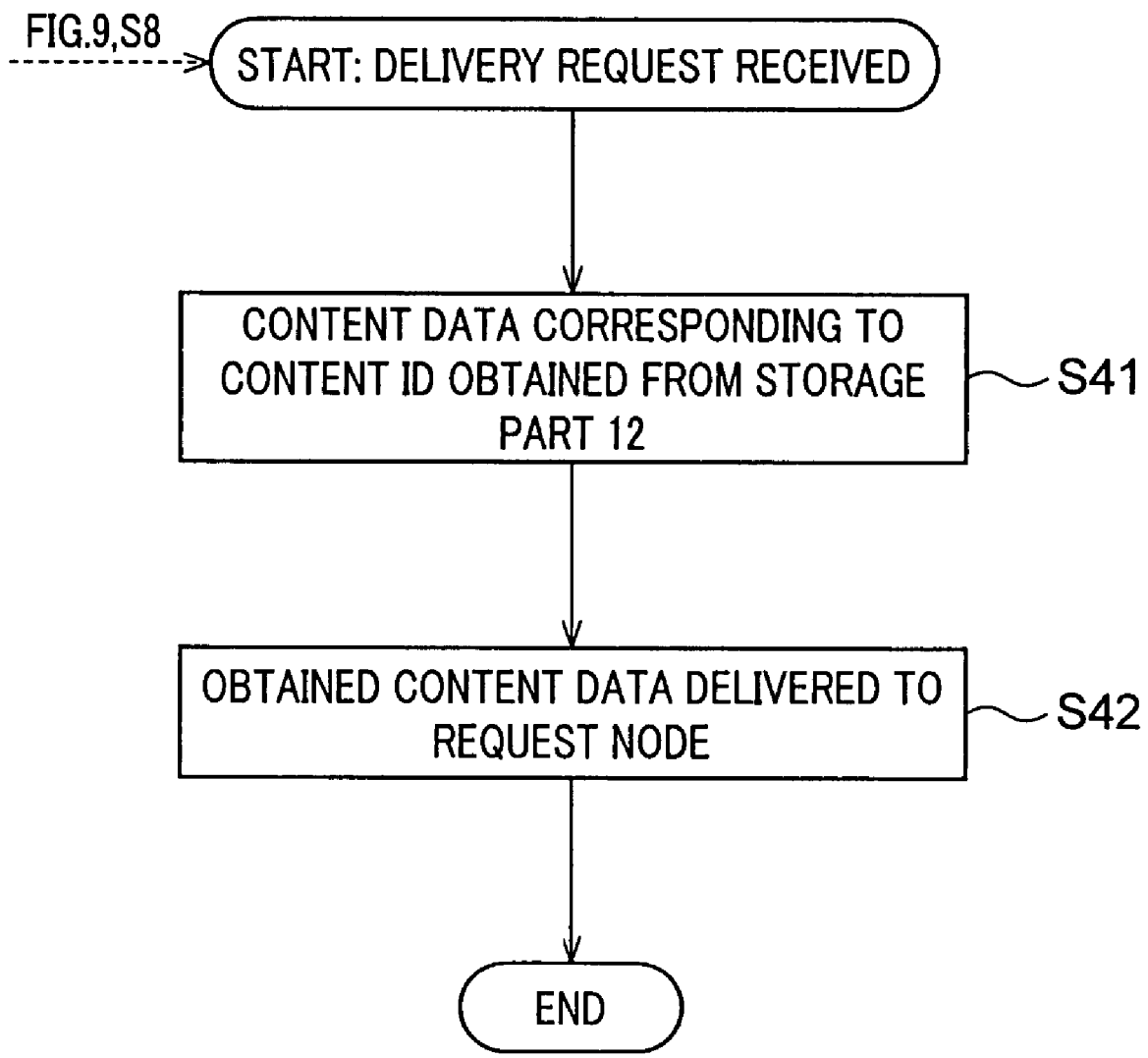
FIG. 11 is a flow chart showing processing by a control part 11 in a content node.

Next, using FIGS. 10 and 11, processing in a cache node and a route node will be explained. FIG. 10 is a flow chart showing transfer processing which is performed when a transfer program saved in the control part 11 in a cache node or a route node is performed by the control part 11. The processing starts with reception of a query transmitted from other node device in the content delivery system S including the request node and the cache node.

First, the control part 11 functions as node information search means, recognizes content ID as identification information included in the received query, and searches for content node information (an IP address of a content node) corresponding to the content ID from index information saved in the storage part 12 of the control part 11 (Step S21). Note that when already-transmitted node information has been received with the query, information same as the already transmitted node information is excluded from the target of search.

Then, it is judged whether content node information corresponding to the content ID has been found or not (Step S21) and when not found (Step S22: No), the control part 11 judges whether the control part 11 itself is a route node or not (Step S23) and when the control part 11 itself is not a route node (Step S23: No) the query is transferred to an upper stream node device, that is, a node device located between the control part 11 and a route node (Step S24), and the processing is finished. Note that when there is no node device in between, the query is transferred to the route node.

According to the example shown in FIG. 7, the query from the request node is transmitted to an intermediate node first, then later, transferred to the cache node Ka from the intermediate node.

On the other hand, when the control part 11 itself is a route node in the judgment in Step S23, it is judged whether one or more relevant information has been transmitted to the request node while the query is transferred or not (Step S25). Whether at least one node information has been transmitted to the request node or not can be judged by checking whether already-transmitted node information has been received with the query or not.

As another method, when one or more node information has been transmitted, as described in later processing in Step S32, request number information included in the query is updated and therefore, when the request number information is updated, information which shows existence of update history is attached to the request number information. For this purpose, in the request number information, request number from the original requester (this number is not updated) is included other than the request number and when the original request number and the current request number differ from each other, it is understood that the query has been updated.

In Step S25, when it is judged that there is no update history in the request number included in the query and no relevant information has been transmitted to the request node (Step S25: Yes), the control part 11 functions as error reply means and transmits an error reply to the request node (Step S26) and the processing is finished. Meanwhile, when there is update history in the request number information of the received query, that is, one or more relevant information has been transmitted to the request node (Step S25: No) the processing is finished.

Moreover, in the processing in Step S22, when node information of a content node corresponding to the content ID is found (Step S22: Yes), whether the amount of the found information is equal to or more than request number indicated by request number information included in the query or not is judged (Step S27). When the amount of the found information is equal to or more than request number (Step S27: Yes), the control part 11 functions as node information transmission means to transmit the node information for the amount of the request number to the request node (Step S28). Note that when the found amount exceeds the request number (Step S27: Yes), all the found node information may be transmitted to the request node. However, in this case, when specific node information is transmitted with high frequency, load of the content node becomes large. Therefore, in such a case, among found node information, node information for the amount of the request number is randomly selected and transmitted.

On the other hand, when node information equal to or more than the amount of the request number indicated by the request number information could not be found (Step S27: No), the control part 11 transmits the found node information to the request node (Step S29).

To explain specifically based on an example shown in FIG. 7, when the cache node Ka receives a query of which content ID is "30001012" and request number is "4", the cache node Ka refers to index information saved in the storage part 12 and searches for node information of a content node which corresponds to the content ID "30001012". Then, as shown in the figure, node information of two content nodes corresponding to the content ID "30001012" are found. In this case, since the amount does not satisfy the request number, the node information of a content node Ca (IP address "121.43.154.65") and node information of a content node Cb (IP address "243.5.154.65") thus found are transmitted from the cache node Ka to the request node, as shown in FIG. 8.

Subsequently, it is judged whether the control part 11 itself is a route node or not (Step S30) and when the control part 11 is not a route node (Step S30: No), the control part 11 functions as update means and transfer means. The control part 11 updates the request number information by setting anew request number by subtracting "1" from the request number indicated by the request information included in the query and further, after including the updated request number as new request information in the query, transfers node information already transmitted in Step S29 as already-transmitted node information to an upper stream node device, that is, a node device in between the control part 11 and a route node (Step S32) and finishes the processing. Note that when the node device in between does not exist, the query and already-transmitted node information are transferred to the route node.

That is, by transmitting already-transmitted node information to an upper stream node device, the control part 11 instructs the upper stream node device to exclude content nodes having the same node information as the already-transmitted node information from target of search. To explain specifically using FIG. 7, the cache node Ka subtracts "2" which is number of node information found by the cache node Ka from the original request number "4" to update the request information, includes the number as new request number information in the query, and transmits IP addresses "121.43.154.65" and "243.5.154.65" of already found node information as already-transmitted node information together with the query to the cache node Kb.

Then, the cache node Kb which received the query refers to index information saved in the storage part 12 of the cache node Kb itself in Step S22 and searches for node information which corresponds to the content ID "30001012" and is different from the already-transmitted node information. According to the example shown in FIG. 7, in the index information saved in the storage part 12 of the cache node Kb, as node information corresponding to the content ID, IP addresses "132.122.11.12", "243.5.154.65", and "121.43.154.65" are saved. Among them, IP addresses "243.5.154.65", and "121.43.154.65" have already been transmitted by the cache node Ka. That is, since the IP addresses "243.5.154.65", and "121.43.154.65" have been received as already-transmitted node information together with the query, in the cache node Kb, the already-transmitted node information is excluded and as node information corresponding to the content ID, node information of a content node Cc (IP address "132.122.11.12") is transmitted to the request node. Then, "1" is subtracted from the request number information included in the query received from the cache node Ka for update and the request number information thus updated is included in the query again. Furthermore, the IP address "132.122.11.12" is attached to the already-transmitted node information, that is, the already-transmitted node information is caused to include IP addresses "121.43.154.65", "243.5.154.65", and "132.122.11.12" and the query and the already-transmitted node information are transmitted to the route node.

Then, the route node which received the query refers to index information saved in the storage part 12 of the route node and searches for node information which corresponds to the content ID "30001012" and is different from the already-transmitted node information. As a result, node information of a content node Cd (IP address "125.15.35.42") is found and transmitted to the request node.

Note that in the processing in Step S30, when the control part 11 itself is a route node (Step S30: Yes), an error reply is transmitted to the request node (Step S33) and the processing is finished.

As explained above, when request for node information of a plurality of node devices is made from the request node, node information is transmitted to the request node every time the node information is found in each cache node and when a query is transferred (relayed) to upper stream, node information found in the cache node and transmitted to the request node is transferred as already-transmitted node information together with the query. Therefore, an upper stream request node can search for node information while excluding the already-transmitted node information from the target of the search.

Moreover, since the above-mentioned processing is performed while updating the request number by a cache node or a route node, it is possible to unfailingly transmit node information for the amount of the request number to the request node and, furthermore, every time node information is found while the query is transferred to the upper stream, node information is transmitted to the request node. Therefore, it is possible for the request node to perform delivery request by making an access to the content nodes by the order based on the received node information.

[3-3. Processing in Content Node]

Next, using FIGS. 7, 8 and 11, processing in a content node will be explained. FIG. 11 is a flow chart showing processing performed when a delivery program saved in a control part 11 of a content node is performed by the control part 11.

The processing starts with reception of a query transmitted from the request node.

First, content data corresponding to a content ID included in the query is obtained from the storage part 12 (Step S41).

Then, the control part 11 functions as delivery means and delivers the content data thus obtained to the request node (Step S42).

As explained above, according to the present embodiment, when location of content data is inquired by a request node, the request node transmits number of requested node information as request number information and can receive delivery of the content from a plurality of content nodes. Therefore, it is possible to obtain desired content mode quickly.

Moreover, since node information which has already been transmitted is transmitted together as already-transmitted node information when the query is transferred (relayed) to an upper stream node device, the upper stream node device which receives the query and the already-transmitted node information can exclude the already-transmitted node information from the search target performed in the processing by the upper stream node device itself. Therefore, it is possible to prevent transmission of the same node information to the request node.

In addition, since request number information can be attached to the query and the request number information can be updated, it is possible to unfailingly satisfy the number of requested node information that the request node requests.

Furthermore, in case where the query is transferred to a route node and yet content could not be found, an error reply is transmitted to the request node. Therefore, the request node can easily understand that the desired content does not exist in the content delivery system S for the amount of the request number.

Still furthermore, since the request node sets request number and includes it in the query, when the query is transferred, the route node or the cache node can update the request number by subtracting the number of node information already transmitted to the request node and then transfer the query, enabling the request node to unfailingly obtain node information of the content node for the amount of the request number. Therefore, when the request number of node information is set large, it is possible to receive delivery of the content from many content nodes in a juxtaposing manner and there is an advantage that the content can be obtained more quickly. On the other hand, when the request number of node information is set small, there is an advantage that it is possible to obtain node information of the content node in a short period of time. Therefore, a user of the request node can change the setting depending on usage or popularity of the content.

[4. Modified Embodiment]

As explained in the above-mentioned [1-4. Registration of content data], each content is registered in the content delivery system S by transmitting an open message. When a node device receives an open message and saves content ID or the like as index information, which is included in the open message, in a storage part 12 of the node device, the node device also saves a node device which transmitted the open message according to the DHT routing table as a relay transmitter node device while coordinating node information of the relay transmitter node device as a back pointer with the relay transmitter node device. Thus, it becomes unnecessary for a cache node, which received each node device query in the same flow as the open message, to carry out processing for transferring the received node information (already-transmitted node information) to an upper stream node device (refer to Step S32).

Hereafter, using figures, explanation will be made in details.

Figure 12:
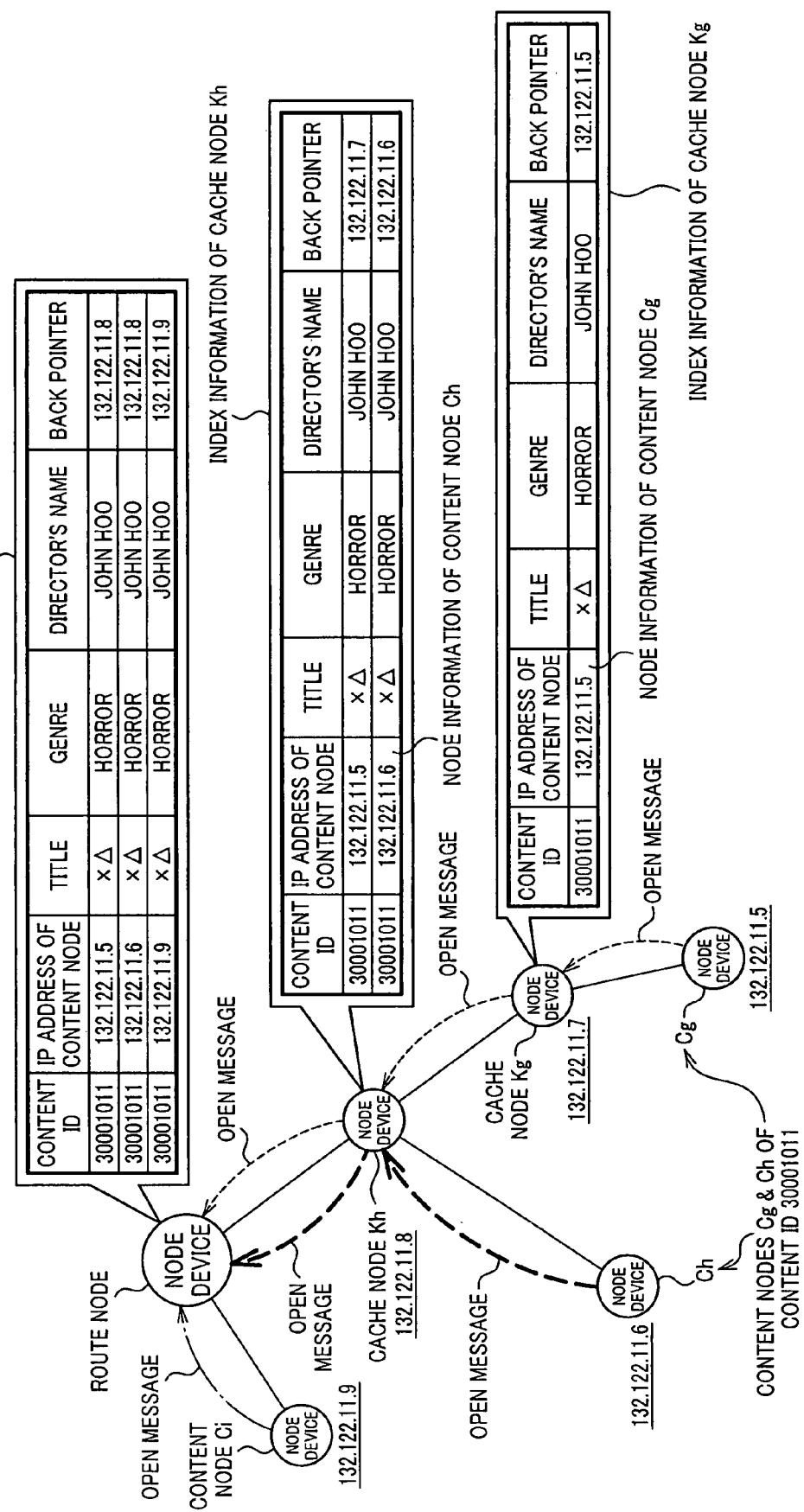
FIG. 12 is a graphical illustration where flow of an open message is expressed as a spanning tree.

FIG. 12 is a graphical illustration in which flow of an open message is expressed as a spanning tree.

Each of content nodes Cg, Ch, and Ci which has content of which content ID is "30001011" transmits an open message to a route node according to a routing table so that the content is registered in the content delivery system S with the content ID as identification information serving as a key.

A node device which received the open message from the content node Cg becomes a cache node Kg and saves the content ID, auxiliary information (such as attribute information, e.g., title and genre of the content, or copyright information, e.g., name of director), IP address of the content node Cg as node information, all of which are included in the open message, and further, as back pointer, node information of a node device which transmitted the open message by coordinating it, into index information save in a storage part 12 of the cache node Kg. In case of FIG. 12, the cache node Kg saves an IP address "132.122.11.5" of the content node Cg which is a relay transmitter node device of the open message as a back pointer.

Then, a node device to which an open message from the cache node Kg has been transferred becomes a cache node Kh and saves the content ID, auxiliary information, IP address of the content node Cg as node information, all of which are included in the open message, and further, as back pointer, node information of a node device which transmitted the open message by coordinating it, into index information save in a storage part 12 of the cache node Kh. In case of FIG. 12, the cache node Kh saves an IP address "132.122.11.7" of the cache node Kg which is a relay transmitter node device of the open message as a back pointer.

Moreover, since the cache node Kh has received an open message from the content node Ch, the cache node Kh saves the content ID, auxiliary information, IP address of the content node Ch as node information, all of which are included in the open message, and also, saves an IP address "132.122.11.6" of the content node Ch which is a relay transmitter node device of the open message as a back pointer.

Then a node device which received the open message regarding the content nodes Cg and Ch from the cache node Kh also coordinates information such as content ID included in the open message and node information of cache node Kh which is a relay-transmitter node that transferred the open message as a back pointer and saves them in index information of a storage part 12 of the route node. Moreover, the route node receives the open message from the content node Ci, coordinates the content ID included in the open message, auxiliary information, and node information with an IP address "132.122.11.9" which is node information of a content node which is relay-transmitter node of the open message and saves them.

Figure 13:
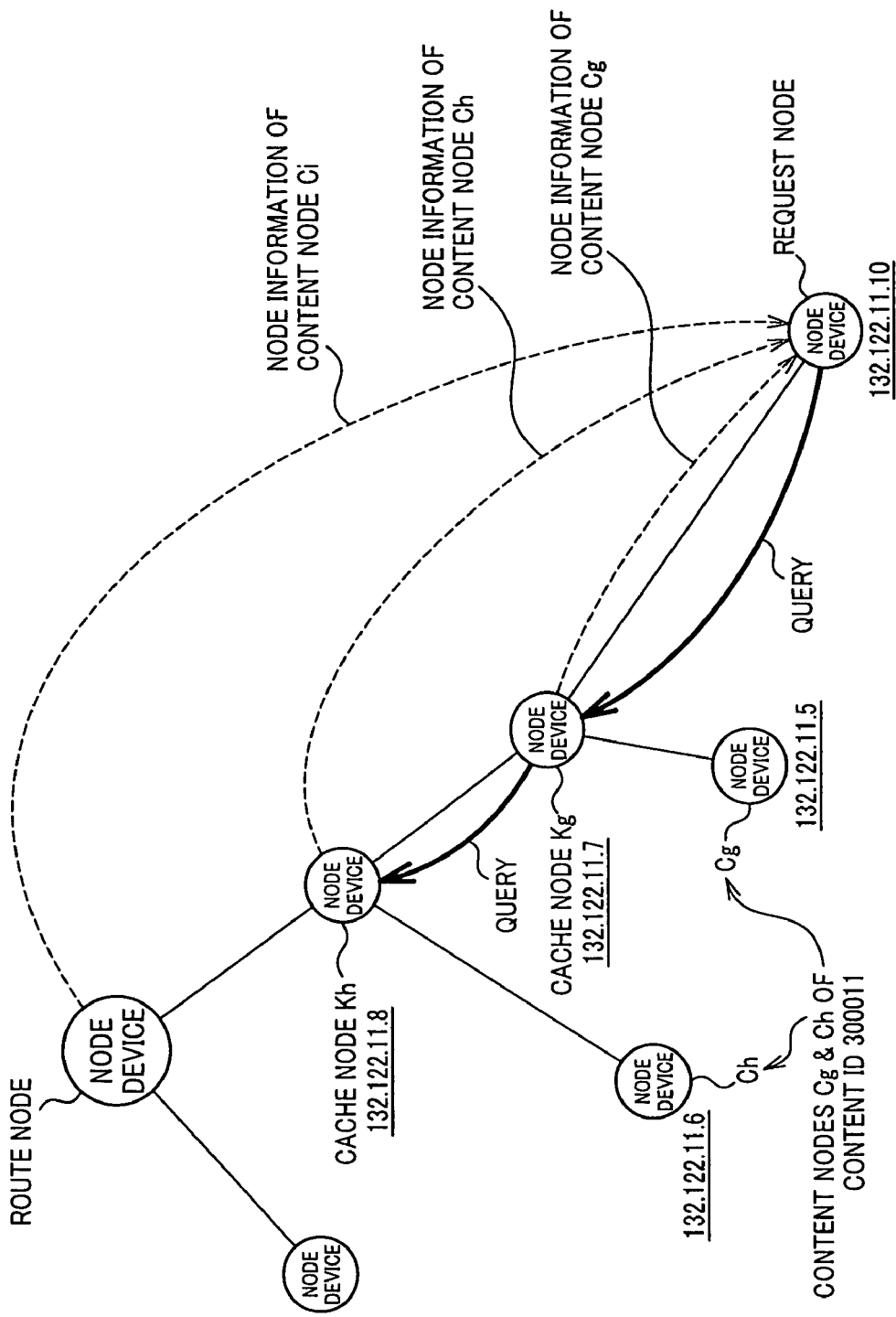
FIG. 13 is a graphical illustration where how a query is transferred and how node information of content nodes is replied is expressed as a spanning tree.

FIG. 13 is a graphical illustration in which how a query (content inquiry information) is transferred and how node information of content nodes is replied in response to the query are expressed as a spanning tree.

First, a request node transmits a query of which content ID is "30001011" and a request number is "3". The query is transmitted according to a routing table with the content ID as a key and received by the cache node Kg.

Then, the cache node Kg recognizes the content ID included in the query thus received as identification information, searches for node information of a content node which corresponds to the content ID from index information of the storage part 12 of the cache node Kg, and transmits the node information to the request node. At this point of time, the request number is updated from "3" to "2" and, furthermore, the query is transferred.

Upon reception of the query, the cache node Kh recognizes the content ID included in the query thus received as identification information, searches for node information of a content node which corresponds to the content ID from index information of the storage part 12 of the cache node Kh, and transmits the node information to the request node. At this point of time, the request number is updated from "2" to "1" and, furthermore, the query is transferred.

Upon reception of the query, the route node recognizes the content ID included in the query thus received as identification information, searches for node information of a content node which corresponds to the content ID from index information of the storage part 12 of the route node, and transmits the node information to the request node.

When search is performed in each cache nodes and the route node, node information saved as the back pointer which is saved in the index information is referred and node information of a content node which is different from a relay transmitter node device is transmitted to the request node. As for node information of the relay transmitter node device of the query, each of the node devices may transmit the node information of the self by including it in the query.

In case of the example shown in FIGS. 12 and 13, the cache node Kg which received the query from the request node transmits node information of the content node Cg to which node information: IP address "132.122.11.10" of the request node as a relay-transmitter of the query has not been coordinated with a back pointer is transmitted to the request node.

The cache node Kh which received the query from the cache node Kg transmits node information of the content node Ch to which node information: IP address "132.122.11.7" of the cache node Kg as a relay-transmitter of the query has not been coordinated with a back pointer is transmitted to the request node from among node information of content nodes which are in the index information and have a content ID of "30001011". This is because node information of a content node, which saves the node information same as the node information of the cache node Kg which is relay-transmitter of the query as a back pointer, has already been transmitted to the request node.

Moreover, the route node which received the query from the cache node Kh transmits node information of the content node Ci, with which node information: IP address "132.122.11.7" of the cache node Kg as a relay-transmitter of the query has not been coordinated a back pointer, is transmitted to the request node. This is because node information of the content nodes, which save the node information same as the node information of the cache node Kh which is relay-transmitter of the query as a back pointer ("132.122.11.5" and "132.122.11.6"), has already been transmitted to the request node.

This is because both the query and the open messages are transferred according to a routing table for which a content ID becomes a key. Making use of a characteristic that they reach the route node following the same transfer route, a cache node or a route node which received the query also receives the open message and when information of a content node is saved, a relay-transmitter of the query is saved. Hence, for a query from a certain relay-transmitter, node information of a content node which has been saved via another relay node device can be transmitted, while preventing transmission of the same node information twice and enabling transmission of node information which has not been transmitted yet without fail. Thus, processing to transfer already-transmitted node information together with the query, as performed in Step S32, becomes unnecessary.

Note that as mentioned above, when already-transmitted node information is judged by use of a back pointer, as information to show whether request number information has been updated or not, update history flag is attached when the request number information is updated. In the update history flag, for example, no update history is indicated by "0" and in case updated, indicated with "1".

Then, in the above-mentioned Step S25, when the update history flag is "1", it is judged that node information has been transmitted to the request node and when the update history flag is "0", it may be judged that no node information has been transmitted to the request node.

What is claimed is:

1. An information communication system having a plurality of node devices connected to each other to thereby configure a network, comprising:

a first node device included in the plurality of node devices comprising:

a request information transmission unit for transmitting request information to a second node device, the request information including: unique identification information corresponding to specific common information which is specified out of common information to be shared among the plurality of node devices; and request number information indicative of a number of location information which the first node device requires, the location information being indicative of a location in the network of information saving node devices saving the specific common information; and the second node device comprising:

a saving unit for saving the location information, and unique identification information corresponding to the specific common information so that the location information is associated with the unique identification information;

a determination unit for, when receiving the request information from any of the plurality of node devices, determining whether or not a number of the location information of the information saving node devices, which save the specific common information associated with the unique identification information included in received request information, in the saving unit, meet the number of location information indicated by the request number information included in the received request information;

a location information transmission unit for transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and a transfer unit for transferring the received request information, in a case where the second node device itself is not a management node device which manages the specific common information, to a node device interposed between the second node device and the management node device, or to the management node device in a case where there is no node device therebetween.

2. The information communication system according to claim 1,
wherein the second node device further comprises:
an update unit for updating the request number by subtracting the number of the location information which is transmitted by the location information transmission unit to the first node device, from the request number in a case where the determination unit determines that the number of the location information saved in the saving unit does not meet the number of the location information indicated by the received request number information and further in a case where the second node device itself is not the management node device,
wherein the transfer unit in the second node device transfers the request information in which the updated request number is rendered a new request number information.

3. The information communication system according to claim 1,
wherein, in a case where the second node device itself is not the management node device, the transfer unit transfers the received request information and transmitted location information to a node device interposed between the second node device and the management node device, the transmitted location information being transmitted to the first node device by the location information transmission unit,
wherein, in a case where the second node device itself is not the management node device and there is no node device between the second node device and the management node device, the transfer unit transfers the received request information and the transmitted location information to the management node device.

4. The information communication system according to claim 3,
wherein in a case where the second node device receives the transmitted location information upon receipt of the request information, the determination unit determines whether or not the location information of the information saving node device saving the specific common information corresponding to the identification information from among location information other than location information that is the same as the transmitted location information is saved in the saving unit.

5. The information communication system according to claim 1, wherein
the first node device further comprises:
a receiving unit for receiving the location information from the second node device;
a request unit for requesting transmission of the specific common information to the information saving node device corresponding to the location information; and
a specific common information receiving unit for receiving the specific common information transmitted from the information saving node device.

6. The information communication system according to claim 5
wherein the request unit in the first node device sequentially requests transmission of the specific common information to the information saving node device corresponding to the location information every time the location information is received by the receiving unit, and the specific common information receiving unit in the first node device receives in parallel the specific common information, transmitted from each of the information saving node devices which requests transmission of the specific common information.

7. The information communication system according to claim 5
wherein the second node device further comprises:
an error reply unit for sending the first node device a reply that the number of the location information saved in the saving unit does not meet the number of the location information indicated by the received request number information in a case where the determination unit determines that the number of the location information saved in the saving unit does not meet the number of the location information indicated by the received request number information and further in a case where the second node device itself is a management node device.

8. An information communication method in an information communication system including a plurality of node devices connected to each other to thereby configure a network, comprising:
in a second node device included in a plurality of node devices, saving location information of an information saving node device which saves specific common information, and unique identification information corresponding to the specific common information so that the location information is associated with the unique identification information, the specific common information being specified out of common information to be shared among the plurality of node devices, the location information being indicative of a location in the network of the information saving node devices saving the specific common information;
in a first node device included in the plurality of node devices, generating request information including: unique identification information corresponding to the specific common information; and request number information indicative of a number of the location information which the first node device requires;
in the first node device, transmitting the request information to the second node device;
in the second node device, when receiving the request information from any of the plurality of node devices, determining whether or not the number of the location information of the information saving node devices, which save the specific common information associated with the unique identification information included in received request information, meets the number of location information indicated by the request number information included in the received request information;
in the second node device, transmitting at least the location information whose number corresponds to the number of location information indicated by the received request number information to the first node device when it is determined that the number of the location information saved in the second node device meets the number of location information indicated by the received request number information;
in the second node device, transmitting the location information whose number corresponds to the number of the location information saved in the second node device to the first node device when it is determined that the number of the location information saved in the second node device does not meet the number of location information indicated by the received request number information; and in the second node device, transferring the received request information, in a case where the second node device itself is not a management node device which manages the specific common information, to a node device interposed between the second node device and the management node device, or to the management node device in a case where there is no node device therebetween.

9. The information communication method according to claim 8, wherein the method further comprises:

in the second node device, updating the request number by subtracting the number of the location information which is transmitted by the second node device to the first node device from the request number in a case where it is determined that the number of the location information saved in the second node device does not meet the number of the location information indicated by the received request number information and further in a case where the second node device itself is not the management node device, and in the second node device, transferring the request information in which the updated request number is rendered a new request number information.

10. The information communication method according to claim 8, wherein the method further comprises:

in the second node device, transferring the received request information and transmitted location information to a node device interposed between the second node device and the management device in a case where the second node device itself is not the management device, the transmitted location information being transmitted to the first node device by the second node device; and in the second node device, transferring the received request information and the transmitted location information to the management device in a case where the second node device itself is not the management node device and there is no node device between the second node device and the management node device.

11. The information communication method according to claim 10, wherein the method further comprises:

in the second node device, determining whether or not the location information of the information saving node device saving the specific common information corresponding to the identification information from among location information other than location information that is the same as the transmitted location information is saved in the second node device in a case where the second node device receives the transmitted location information upon receipt of the request information.

12. The information communication method according to claim 8, wherein the method further comprises:

in the first node device, receiving the location information from the second node device;

in the first node device, requesting transmission of the specific common information to the information saving node device corresponding to the location information; and in the first node device, receiving the specific common information transmitted from the information saving node device.

13. The information communication method according to claim 12, wherein the method further comprises:

in the first node device, sequentially requesting transmission of the specific common information to the information saving node device corresponding to the location information every time the location information is received by the first node device; and in the first node device, receiving in parallel the specific common information transmitted from each of the information saving node devices which requests transmission of the specific common information.

14. The information communication method according to claim 12, wherein the method further comprises:

in the second node device, sending the first node device a reply that the number of the location information saved in the second node device does not meet the number of the location information indicated by the received request number information in a case where it is determined that the number of the location information saved in the second node device does not meet the number of the location information indicated by the received request number information and further in a case where the second node device itself is a management node device.

15. A first node device included in a plurality of node devices which are connected to each other to thereby configure an information communication system in a network, comprising:

a request information generation unit for generating request information including: unique identification information corresponding to specific common information which is specified out of common information to be shared among the plurality of node devices; and request number information indicative of a number of location information which the first node device requires, the location information being indicative of a location in the network of information saving node devices saving the specific common information; and a request information transmission unit for transmitting the request information to a second node device include in the plurality of node devices.

16. The first node device according to claim 15, wherein the first node device further comprises:

a receiving unit for receiving the location information from the second node device;

a request unit for requesting transmission of the specific common information to the information saving node device corresponding to the location information; and a specific common information receiving unit for receiving the specific common information transmitted from the information saving node device.

17. The first node device according to claim 16, wherein the request unit in the first node device sequentially requests transmission of the specific common information to the information saving node device corresponding to the location information every time the location information is received by the receiving unit, and the specific common information receiving unit in the first node device receives in parallel the specific common information, transmitted from each of the information saving node devices which requests transmission of the specific common information.

18. A second node device included in a plurality of node devices which receives request information including: unique identification information corresponding to specific common information which is specified out of common information to be shared among the plurality of node devices; and request number information indicative of a number of location information which a first node device requires, the location information being indicative of a location in a network of information saving node devices saving the specific common information, the first node device being included in the plurality of node devices which configure an information communication system having the plurality of node devices to thereby configure the network by connecting to each other, comprising:

a saving unit for saving the location information, and unique identification information corresponding to the specific common information so that the location information is associated with the unique identification information;

a determination unit for, when receiving the request information from any of the plurality of node devices, determining whether or not the number of the location information of the information saving node device, which saves the specific common information associated with the unique identification information included in the received request information, in the saving unit, meets the number of location information indicated by the request number information included in the received request information:

a location information transmission unit for transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and a transfer unit for transferring the received request information, in a case where the second node device itself is not a management node device which manages the specific common-information, to a node device interposed between the second node device and the management node device, or to the management node device in a case where there is no node device therebetween.

19. The second node device according to claim 18, wherein the second node device further comprises:

an update unit for updating the request number by subtracting the number of location information which is transmitted by the location information transmission unit to the first node device, from the request number in a case where the determination unit determines that the number of the location information saved in the saving unit does not meet the number of the location information indicated by the received request number information and further in a case where the second node device itself is not the management node device, wherein the transfer unit in the second node device transfers the request information in which the updated request number is rendered a new request number information.

20. The second node device according to claim 18, wherein the first node device further comprises:

a receiving unit for receiving the location information from the second node device;

a request unit for requesting transmission of the specific common information to the information saving node device corresponding to the location information; and a specific common information receiving unit for receiving the specific common information transmitted from the information saving node device;

wherein the second node device further comprises:

an error reply unit for sending the first node device a reply that the number of the location information saved in the saving unit does not meet the number of the location information indicated by the received request number information in a case where the determination unit determines that the number of the location information saved in the saving unit does not meet the number of the location information indicated by the received request number information and further in a case where the second node device itself is a management node device.

21. The second node device according to claim 18, wherein, in a case where the second node device itself is not the management node device, the transfer unit transfers the received request information and transmitted location information to a node device interposed between the second node device and the management node device, the transmitted location information being transmitted to the first node device by the location information transmission unit, wherein, in a case where the second node device itself is not the management node device and there is no node device between the second node device and the management node device, the transfer unit transfers the received request information and the transmitted location information to the management node device.

22. The second node device according to claim 21, wherein in a case where the second node device receives the transmitted location information upon receipt of the request information, the determination unit determines whether or not the location information of the information saving node device saving the specific common information corresponding to the identification information from among location information other than location information that is the same as the transmitted location information is saved in the saving unit.

23. A delivery request program stored in a non-transitory computer-readable storage medium causing a computer, included in a first node device, which is included in a plurality of node devices configuring an information communication system and connected to each other to thereby configure a network, to execute steps of:

requesting information including: unique identification information corresponding to specific common information which is specified out of common information to be shared among the plurality of node devices; and request number information indicative of a number of location information which the first node device requires, the location information being indicative of a location in the network of information saving node devices saving the specific common information; and transmitting the request information to a second node device which is included in the plurality of node devices.

24. The non-transitory computer-readable storage medium according to claim 23, the medium causing a computer in the first node device to further execute steps of:

receiving the location information from the second node device;

requesting transmission of the specific common information to the information saving node device corresponding to the location information; and receiving the specific common information transmitted from the information saving node device.

25. The non-transitory computer-readable storage medium according to claim 24, the medium causing the computer in the first node device to further execute steps of:

sequentially requesting transmission of the specific common information to the information saving node device corresponding to the location information every time the location information is received by the receiving unit, and the specific common information receiving unit in the first node device receives in parallel the specific common information, transmitted from each of the information saving node devices which requests transmission of the specific common information.

26. A non-transitory computer-readable storage medium causing a computer, included in a second node device, which is included in a plurality of node devices which receives request information including: unique identification information corresponding to specific common information which is specified out of common information to be shared among the plurality of node devices; and request number information indicative of a number of location information which a first node device requires, the location information being indicative of a location in a network of information saving node devices saving the specific common information, the first node device being included in the plurality of node devices which configure an information communication system having the plurality of node devices to thereby configure the network by connecting each other, to execute steps of:

saving the location information, and unique identification information corresponding to the specific common information so that the location information is associated with the unique identification information;

when receiving the request information from any of the plurality of node devices, determining whether or not the number of the location information of the information saving node device, which saves the specific common information associated with the unique identification information included in a received request information, in the saving unit, meets the number of location information indicated by the request number information included in the received request information;

transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and transferring the received request information, in a case where the second node device itself is not a management node device managing the specific common information, to a node device interposed between the second node device and the management node device, or to the management node device in a case where there is no node device therebetween.

27. The non-transitory computer-readable storage medium according to claim 26, the medium causing a computer in the second node device to further execute steps of:

updating the request number by subtracting the number of location information which is transmitted by the location information transmission unit to the first node device, from the request number in a case where the determination unit determines that the number of the location information saved in the saving unit does not meet the number of the location information indicated by the received request number information in a case where the second node device itself is not the management node device, and transferring the request information in which the updated request number is rendered a new request number information.

28. The non-transitory computer-readable storage medium according to claim 26, wherein the first node device further comprises:

a receiving unit for receiving the location information from the second node device;

a request unit for requesting transmission of the specific common information to the information saving node device corresponding to the location information; and a specific common information receiving unit for receiving the specific common information transmitted from the information saving node device, wherein the non-transitory computer-readable storage medium causing a computer in the second node device to further execute steps of:

sending the first node device a reply that the number of location information saved in the saving unit does not meet the number of the location information indicated by the received request number information in as case where the determination unit determines that the number of the location information saved in the saving unit does not meet the number of the location information indicated by the received request number information and further in a case where the second node device itself is a management node device.

29. The non-transitory computer-readable storage medium according to claim 26, the medium causing a computer in the second node device to further execute steps of:

in a case where the second node device itself is not the management node device, transferring the received request information and transmitted location information to a node device interposed between the second node device and the management node device, the transmitted location information being transmitted to the first node device by the location information transmission unit; and in a case where the second node device itself is not the management node device and there is no node device between the second node device and the management node device, transferring the received request information and the transmitted location information to the management node device.

30. The non-transitory computer-readable storage medium according to claim 29, the medium causing the computer in the second node device to further execute steps of:

in a case where the transmitted location information upon receipt of the request information is received, determining whether or not the location information of the information saving node device saving the specific common information corresponding to the identification information from among location information other than location information that is the same as the transmitted location information is saved in the saving unit.

31. An information communication system having a plurality of node devices connected to each other to thereby configure a network, comprising:

a first node device included in the plurality of node devices, comprising:

a request information transmission unit for transmitting request information to a second node device according to a routing table, the request information including: unique identification information corresponding to specific common information which is specified out of common information to be shared among the plurality of node devices; and request number information indicative if a number of location information which the first node device requires, the location information being indicative of a location in the network of information saving node devices saving the specific common information, the unique identification information corresponding to the specific common information is used as a key in the routing table; and wherein the second node device comprising:

a saving unit for saving the location information, and unique identification information corresponding to the specific common information so that the location information is associated with the unique identification information, the location information and the unique identification information being transmitted in accordance with the routing table using the unique identification information corresponding to the specific common information as a key;

a determination unit for, when receiving the request information from any of the plurality of node devices, determining whether or not a number of the location information of the information saving node devices, which save the specific common information associated with the unique identification information included in received request information, in the saving unit, meet the number of location information indicated by the request number information included in the received request information;

a location information transmission unit for transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and a transfer unit for transferring the received request information, in a case where the second node device itself is not a management node device which manages the specific common information, to a node device interposed between the second node device and the management node device, or to the management node device in a case where there is no node device therebetween.

32. An information communication method in an information communication system including a plurality of node devices connected to each other to thereby configure a network, comprising:

in a second node device included in a plurality of node devices, saving location information of an information saving node device which saves specific common information, and unique identification information corresponding to the specific common information so that the location information is associated with the unique identification information, the specific common information being specified out of common information to be shared among the plurality of node devices, the location information being indicative of a location in the network of the information saving node device saving the specific common information, the specific common information being transmitted in accordance with a routing table using the unique identification information corresponding to the specific common information;

in a first node device included in a plurality of node devices generating request information including: unique identification information corresponding to the specific common information; and request number information indicative of a number of the location information which the first node device requires;

in the first node device, transmitting the request information to the second node device in accordance with the routing table using the unique identification information corresponding to the specific common information as a key;

in the second node device, when receiving the request information from any of the plurality of node devices, determining whether or not the number of the location information of the information saving node device, which saves the specific common information associated with the unique identification information included in the received request information, meets the number of location information indicated by the request number information included in the received request information;

in the second node device, transmitting at least the location information whose number corresponds to the number of location information indicated by the received request number information to the first node device when it is determined that the number of the location information saved in the second node device meets the number of location information indicated by the received request number information;

in the second node device, transmitting the location information whose number corresponds to the number of the location information saved in the second node device to the first node device when it is determined that the number of the location information saved in the second node device does not meet the number of location information indicated by the received request number information; and in the second node device, transferring the received request information, in a case where the second node device itself is not a management node device which manages the specific common information, to a node device interposed between the second node device and the management node device, or to the management node device in a case where there is no node device therebetween.

33. A second node device included in a plurality of node devices which receives request information including: unique identification information corresponding to specific common information which is specified out of common information to be shared among the plurality of node devices; and request number information indicative of a number of location information which a first node device requires, the location information being indicative of a location in a network of information saving node devices saving the specific common information, the first node device being included in the plurality of node devices which configure an information communication system having the plurality of node devices to thereby configure the network by connecting to each other, comprising:

a saving unit for saving the location information, and unique identification information corresponding to the specific common information so that the location information is associated with the unique identification information, the location information and the unique identification information being transmitted in accordance with the routing table using the unique identification information corresponding to the specific common information as a key;

a determination unit for, when receiving the request information from any of the plurality of node devices, determining whether or not the number of the location information of the information saving node devices, which save the specific common information associated with the unique identification information include in a received request information, in the saving unit, meet the number of location information indicated by the request number information included in the received request information;

a location information transmission unit for transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and a transfer unit for transferring the received request information, in a case where the second node device itself is not a management node device which manages the specific common information, to a node device interposed between the second node device and the management node device, or to the management node device in a case where there is no node device therebetween.

34. A transfer program stored on a non-transitory computer-readable storage medium which causes a computer included in a second node device, which is included in a plurality of node devices which receives request information including: unique identification information corresponding to specific common information which is specified out of common information to be shared among the plurality of node devices; and request number information indicative of a number of location information which a first node device requires, the location information being indicative of a location in a network of information saving node devices saving the specific common information, the first node device being included in the plurality of node devices which configure an information communication system having the plurality of node devices to thereby configure the network by connecting to each other, to execute steps of:

saving the location information, and unique identification information corresponding to the specific common information so that the location information is associated with the unique identification information, the location information and the unique identification information being transmitted in accordance with a routing table using the unique identification information corresponding to the specific common information as a key;

when receiving the request information from any of the plurality of node devices, determining whether or not the number of the location information of the information saving node device, which saves the specific common information associated with the unique identification information included in the received request information, in the saving unit, meets the number of location information indicated by the request number information included in the received request information;

a node information transmission means for transmitting at least the location information whose number corresponds to the number of location information indicated by the received request number information to the first node device when the determination unit determines that the number of the location information saved in the saving unit meets the number of location information indicated by the received request number information, and for transmitting the location information whose number corresponds to the number of the location information saved in the saving unit to the first node device when the determination unit determines that the number of the location information saved in the saving unit does not meet the number of location information indicated by the received request number information; and transferring the received request information, in a case where the second node device itself is not a management node device which manages the specific common information, to a node device interposed between the second node device and the management node device, or to the management node device in a case where there is no node device therebetween.

* * * * *